US012685977B2

(12) United States Patent
Jones et al.

(10) Patent No.: US 12,685,977 B2
(45) Date of Patent: Jul. 21, 2026

(54) POWDER HYDRATION SYSTEMS WITH MIXING APPARATUS AND METHODS OF USE

(71) Applicant: LIFE TECHNOLOGIES CORPORATION, Carlsbad, CA (US)

(72) Inventors: Nephi Jones, Newton, UT (US); Tony Hsiao, Providence, UT (US); Mason Smith, Carlsbad, CA (US)

(73) Assignee: Life Technologies Corp., Carlsbad, CA (US)

(*) Notice: Subject to any disclaimer, the term of this patent is extended or adjusted under 35 U.S.C. 154(b) by 725 days.

(21) Appl. No.: 17/909,509

(22) PCT Filed: Apr. 2, 2021

(86) PCT No.: PCT/US2021/025659
§ 371 (c)(1),
(2) Date: Sep. 6, 2022

(87) PCT Pub. No.: WO2021/203057
PCT Pub. Date: Oct. 7, 2021

(65) Prior Publication Data
US 2023/0110920 A1 Apr. 13, 2023

Related U.S. Application Data

(60) Provisional application No. 63/004,211, filed on Apr. 2, 2020.

(51) Int. Cl.
*B01F 23/53* (2022.01)
*B01F 23/50* (2022.01)
(Continued)

(52) U.S. Cl.
CPC .............. *B01F 23/53* (2022.01); *B01F 23/56* (2022.01); *B01F 25/3121* (2022.01);
(Continued)

(58) Field of Classification Search
USPC ........................................................ 366/163.2
See application file for complete search history.

(56) References Cited

U.S. PATENT DOCUMENTS 2,563,002 A * 8/1951 Bissell ................ B01F 25/3142 137/888
6,254,267 B1 * 7/2001 Arnaud ................... B01F 23/59 366/137.1
(Continued)

FOREIGN PATENT DOCUMENTS

EP 1574462 A1 9/2005
FR 2453805 A1 11/1980
(Continued)

OTHER PUBLICATIONS

International Search Report and Written Opinion dated Aug. 24, 2021, issued in PCT Application No. PCT/US2021/025659, filed Apr. 2, 2021.

*Primary Examiner* — Abbas Rashid

(57) ABSTRACT

A powder mixing system (12) includes a conduit (40) having a first end and an opposing second end, the conduit bounding a passage; a fluid pump (80) fluid coupled with the conduit, the fluid pump being configured to pump a liquid through the passage of the conduit; and a tubular transfer member (190) in fluid communication with the conduit, the transfer member being configured to couple with a powder bag housing a powder. The mixing system further including: (1) an eductor coupled to the transfer member and disposed in-line with the conduit so that the liquid pumped through the conduit also passes through the eductor; and/or (2) an auger assembly comprising an auger blade, at least a portion of the auger assembly being rotatably disposed within the transfer member.

8 Claims, 29 Drawing Sheets

(51) Int. Cl.

| | |
|---|---|
| ***B01F 25/312*** | (2022.01) |
| ***B01F 25/53*** | (2022.01) |
| ***B01F 33/84*** | (2022.01) |
| ***B01F 35/71*** | (2022.01) |

(52) U.S. Cl.

CPC ........ *B01F 25/31243* (2022.01); *B01F 25/53* (2022.01); *B01F 33/84* (2022.01); *B01F 35/71775* (2022.01)

(56) References Cited

U.S. PATENT DOCUMENTS

| | | | | |
|---|---|---|---|---|
| 6,908,223 | B2 | 6/2005 | Bibbo et al. | |
| 7,384,783 | B2 | 6/2008 | Kunas et al. | |
| 7,682,067 | B2 | 3/2010 | West et al. | |
| 8,622,715 | B1 * | 1/2014 | Lott | F04F 5/46 417/198 |
| 2006/0196501 | A1 | 9/2006 | Bibbo et al. | |
| 2015/0298073 | A1 | 10/2015 | Sinha et al. | |
| 2019/0031793 | A1 * | 1/2019 | Smith | B01F 27/192 |

FOREIGN PATENT DOCUMENTS

| | | | |
|---|---|---|---|
| WO | 1995/03240 | A1 | 2/1995 |
| WO | 1995/23549 | A1 | 9/1995 |

* cited by examiner

POWDER HYDRATION SYSTEMS WITH MIXING APPARATUS AND METHODS OF USE

CROSS-REFERENCE TO RELATED APPLICATIONS

The present application claims priority to U.S. Provisional Application No. 63/004,211, filed Apr. 2, 2020, which is incorporated herein by specific reference.

BACKGROUND OF THE INVENTION

1. The Field of the Invention

The present invention relates to powder hydration systems and related mixers and methods that are tailored for use in the biopharmaceutical area.

2. The Relevant Technology

In recent years the biopharmaceutical industry has witnessed a trend toward large-capacity single-use bioreactors (SUBs) and intensified bioproduction processes. This trend has put greater pressure on large-scale cell-culture media preparation. A 5000 L batch of cell culture media can require as much as 120-150 kg of powdered media components and getting these components into solution is a labor-intensive operation.

Typically, large volumes of cell culture media are prepared by suspending large volume powder bags containing powdered media vertically above large hydration containers. The media powder is dispensed directly into the hydration container housing water and mixed by a mixing element until complete hydration is achieved.

Although the conventional system is functional, it is slow, labor intensive, and expensive. For example, conventional systems often require that the hydration containers be built with scaffoldings, walkways or other structures that enable a user to physically access the top of the hydration container for coupling the powder bag to the hydration container, monitoring dispensing from the powder bag, and switching out the powder bags. Such walkways and other structures add significant cost and complexity to the assembly and operation of the hydration container and can occupy valuable space. Furthermore, special lifts are required to lift and position the heavy power bags at the proper location above the hydration containers. Such lifts can be expensive to purchase, install, and maintain. Finally, facilitating mixing of the media powder solely within the large volume hydration container can be slow and time consuming, thereby adding delays to down-stream production.

Another problem with conventional systems is that many powders to be mixed are hydrophobic and have a low bulk density. As a result, the powders tend to float and do not easily mix with the liquid when they are poured into the hydration container. Often, a portion of such powders will migrate to the side of the hydration container where they will adhere as a build-up on the contain and thus never properly mix with the liquid. This loss of powder can be detrimental to the fluid being processed.

Accordingly, what is needed in the art are improved hydration systems that solve all or some of the foregoing problems.

SUMMARY OF THE DISCLOSURE

In one independent aspect of the present disclosure, a powder mixing system includes:

- a conduit having a first end and an opposing second end, the conduit bounding a passage;
- a fluid pump fluid coupled to the conduit, the fluid pump being configured to pump a liquid through the passage of the conduit;
- a tubular transfer member in fluid communication with the conduit, the transfer member configured to couple to a powder bag housing a powder; and further comprising:

- an eductor coupled to the transfer member and disposed in-line with the conduit so that the liquid pumped through the conduit also passes through the eductor; and/or
- an auger assembly comprising an auger blade, at least a portion of the auger assembly being rotatably disposed within the transfer member.

In one exemplary embodiment, the eductor comprising a venturi.

In another exemplary embodiment, the eductor is disposed on the conduit downstream of the fluid pump.

In another exemplary embodiment the eductor further includes a tubular sidewall having an interior surface that bounds a channel extending between an inlet end coupled to the conduit and an opposing outlet end coupled to the conduit, a side opening extending through the sidewall communicating with the channel at a location between the inlet end and the outlet end; and

- the tubular transfer member bounds a passage, and the tubular transfer member further comprises a first end fluid coupled to the side opening of the eductor and an opposing second end configured to couple with the powder bag.

In another exemplary embodiment, the channel of the eductor includes:

- an inlet portion disposed at the inlet end and having a first maximum diameter;
- a receiving portion disposed toward the outlet end and having a second maximum diameter; and
- a constricting portion disposed between the inlet portion and the receiving portion and having a third maximum diameter that is smaller than the first maximum diameter and the second maximum diameter, the side opening being aligned with and communicating with the receiving portion or the constricting portion creating a pressure drop within the eductor when fluid is pumped through the channel and an assisting force that aids in flowing the powder through the transfer member.

In another exemplary embodiment, the constricting portion is frustoconical.

In another exemplary embodiment, the channel of the eductor further includes frustoconical mixing portion disposed downstream of the receiving portion.

Another exemplary embodiment includes a valve disposed on the transfer member, the valve being configured to selectively open and close the passage extending through the transfer member.

In another exemplary embodiment, the transfer member includes a tapered hopper having the first end that is constricted and fluid coupled to the side opening and the opposing second end that bounds an enlarged access opening.

Another exemplary embodiment further includes a plurality of collapsible powder bags coupled to the second end of the hopper, each of the powder bags housing a powder, preferably the plurality of collapsible powder bags comprising at least 2, 3, 4, 6, 8 or 10 collapsible powder bags.

In another exemplary embodiment, the transfer member further includes a lid at least partially covering the access opening of the hopper, the lid having at least 2, 3, 4, 6, 8 or 10 port openings formed thereon that communicate with the hopper, each port opening being configured to couple with a corresponding powder bag.

Another exemplary embodiment further includes the powder bag housing the powder, the powder bag being coupled to one of the port openings of the lid in a sealed fluid communication.

Another exemplary embodiment further includes:

the auger assembly comprising:

a rotatable drive shaft passing through the side opening of the conduit so that a lower portion of the drive shaft is disposed within the passage of the conduit and an upper portion of the drive shaft is at least partially disposed within passage of the transfer member; and an auger blade disposed on the upper portion of the drive shaft so as to be at least partially disposed within passage of the transfer member; and wherein the conduit further comprises a sidewall encircling the passage, a side opening extending through the sidewall and communicating with the passage; and the tubular transfer member bounds a passage and the transfer member further comprises a first end fluid coupled to the side opening of the conduit and an opposing second end configured to couple with the powder bag.

In another exemplary embodiment, the auger assembly further includes a mixing blade disposed on the lower portion of the drive shaft so as to be at least partially disposed within passage of the conduit.

In another exemplary embodiment, the auger assembly further includes:

a base rotatably disposed within the passage of the conduit, the lower end of the drive shaft being secured to the base; and a magnetic driver rotatably disposed outside of the conduit adjacent to the base, the magnetic driver producing a magnetic force on the base such that rotation of the magnetic driver facilitates rotation of the base and drive shaft.

Another exemplary embodiment further includes the powder bag housing the powder, the powder bag being coupled to the transfer member.

In another exemplary embodiment, the powder bag includes a collapsible bag made from one or more sheets of a polymeric film.

In another exemplary embodiment, the powder bag includes:

a collapsible bag that bounds a compartment and is comprised of one or more sheets of a polymeric film, the collapsible bag having a front face and an opposing back face that extend between a first side and a spaced apart second side and that both extend between an upper end and an opposing lower end, the upper end terminating at an upper edge and the lower end terminating at lower edge; and a tubular port secured to the lower end of the collapsible bag, the tubular port bounding an opening that communicates with the compartment of the bag, wherein when the collapsible bag is inflated, the opening of the port has a central longitudinal axis that extends to the upper end of the collapsible bag and the collapsible bag has an asymmetrical configuration about the central longitudinal axis.

Another exemplary embodiment further includes:

the first side of the collapsible bag having a maximum first distance from the central longitudinal axis measured orthogonal from the central longitudinal axis; and the second side of the collapsible bag having a maximum second distance from the central longitudinal axis measured orthogonal from the central longitudinal axis, the maximum second distance being at least 3, 4, 5, 6, 8, 10 or 12 times greater than the first maximum distance.

In another exemplary embodiment, the first side has a length extending between the upper edge and the opposing lower edge, at least 70%, 80%, 90%, or 95% of the length of the first side of the collapsible bag being linear and disposed parallel to the central longitudinal axis.

In another exemplary embodiment, the second side has a length extending between the upper edge and the opposing lower edge, at least 30%, 40%, 50%, or 60% of the length of the second side of the collapsible bag angled or curved relative to the central longitudinal axis.

Another exemplary embodiment further includes:

the tubular transfer member bounding a passage, the transfer member having a first end fluid coupled to the conduit and an opposing second end; and a clamp securing the tubular port of the powder bag to the second end of the transfer member so as to form a sealed fluid communication therebetween.

In another exemplary embodiment, the powder within the powder bag includes a powder media for growing cells or microorganism.

In another exemplary embodiment, the powder within the powder bag includes a powder feed or nutrient for growing cells or microorganism, a powder reagent, a powder buffer, a powder hydrogel, or micro-beads on which adherent cells are grown.

Another exemplary embodiment further includes:

a cart have a plurality of rotatable wheels; and a stand supported on the cart, the conduit and fluid pump being supported by the stand.

Another exemplary embodiment further includes a backflow valve operating with the conduit so as to limit backflow of the liquid into the transfer member when the pump is deactivated.

In another exemplary embodiment, the backflow valve includes a first valve coupled to the conduit downstream of the transfer member, the first valve being operable between a first position wherein a liquid can freely flow through the passage of the conduit and a second position wherein the first valve precludes the flow of fluid through the passage of the conduit.

Another exemplary embodiment further includes a controller in electrical communication with the fluid pump and the first valve, the controller being programmed to automatically move the first valve from the first position to the second position when a predetermined condition of the fluid pump is satisfied.

Another exemplary embodiment further includes a second valve coupled to the conduit upstream of the transfer member, the second valve being operable between a first position wherein a liquid can freely flow through the passage of the conduit and a second position wherein the second valve precludes the flow of fluid through the passage of the conduit.

In a second independent aspect, a powder hydration system includes:

a hydration container bounding a chamber and having an upper end and an opposing lower end;

a liquid disposed within chamber of the hydration container;

the powder mixing system as recited above, wherein:

the first end of the conduit being fluid coupled to the compartment of the hydration container and the opposing second of the conduit being fluid coupled to the compartment of the hydration container;

the fluid pump being configured to pump the liquid from the chamber of the hydration container, through the passage of the conduit and back into the chamber of the hydration container; and a powder bag bounding a compartment and being coupled with the transfer member, the compartment being in communication with passage of the conduit, a powder being disposed within the compartment of the powder bag.

In one exemplary embodiment, the upper end of the hydration container terminates at an upper end wall, the entire powder bag being disposed at an elevation lower than the upper end wall of the hydration container.

In another exemplary embodiment, the powder bag is laterally spaced apart from the hydration container.

In another exemplary embodiment, the liquid comprises water, distilled water, deionized water, water for injection, or a media for growing cells or microorganisms.

In another exemplary embodiment, the first end of the conduit is coupled to the lower end of the hydration container and the second end of the conduit is coupled with the upper end of the hydration container.

In another exemplary embodiment, a diffuser is coupled to the second end of the conduit, the diffuser having a plurality of openings formed thereon through which the liquid passes.

In another exemplary embodiment, the diffuser is submerged within the liquid within the hydration container.

In another exemplary embodiment, the powder within the powder bag includes a powder media for growing cells or microorganism, a powder feed or nutrient for growing cells or microorganism, a powder reagent, a powder buffer, a powder hydrogel, micro-beads on which adherent cells are grown, or combinations thereof.

In another exemplary embodiment, the tubular transfer member bounds a passage, the transfer member having a first end fluid coupled to the conduit so as to communicate with the passage and an opposing second end spaced apart from the conduit, the powder bag being coupled with the second end of the transfer member.

In another exemplary embodiment, the tubular transfer member includes a tapered hopper.

In another exemplary embodiment, a plurality of powder bags are coupled with the hopper, the powder bag comprising one of the plurality of powder bags, each of the plurality of powder bags housing a powder.

In another exemplary embodiment, the plurality of powder bags includes at least 2, 3, 4, 6, 8, 10, 12, or 14 powder bags.

In another exemplary embodiment, the eductor is coupled in-line with the conduit so that the liquid passing though the conduit flows through the eductor, the eductor comprising a venturi, the powder bag being in communication with the eductor so that as the pump pumps the liquid through the eductor, the venturi sucks the powder from the powder bag into the eductor.

In another exemplary embodiment, a backflow valve operating with the conduit so as to limit backflow of the liquid into the transfer member when the pump is deactivated.

Another exemplary embodiment further includes:

a reactor container bounding a chamber;

a fill line extending from the conduit to the chamber of the reactor container; and a valve operable between a closed position wherein the liquid in the conduit is precluded from flowing through the fill line and into the chamber of the reactor container and an open position wherein the liquid in the conduit can flow through the fill line and into the chamber of the reactor container.

In a third independent aspect, a method of mixing a powder with a liquid includes:

coupling a powder bag housing a powder to a conduit, the conduit having a first end coupled with a hydration container and having an opposing second end coupled with the hydration container so as to form a closed loop;

activating a pump so that the pump continuously pumps a liquid within the hydration container, through the conduit and back into the hydration container; and either mechanically or through operation of the liquid pumping through the conduit, cause the powder within the powder bag to be drawn into the liquid passing through the conduit so as to form a liquid mixture.

In one exemplary embodiment, the hydration container has an upper end that terminates at an upper end wall, the powder bag being coupled to the conduit so that the powder bag is disposed at a elevation below the upper end wall.

In another exemplary embodiment, the powder bag is coupled with the conduit so that the powder bag is laterally spaced apart from the hydration container.

In another exemplary embodiment, the powder within the powder bag includes a powder media for growing cells or microorganism, a powder feed or nutrient for growing cells or microorganism, a powder reagent, a powder buffer, a powder hydrogel, or micro-beads on which adherent cells are grown.

Another exemplary embodiment further includes coupling the powder bag to the conduit by way of a tapered hopper.

Another exemplary embodiment further includes coupling a plurality of powder bags to the tapered hopper, the powder bag comprising one of the plurality of powder bags.

In another exemplary embodiment, the powder within the powder bag is caused to be drawn into the liquid passing through the conduit by passing the liquid through an eductor coupled in-line with the conduit, the eductor comprising a venturi, the powder bag being in communication with the eductor so that as the liquid is pumped through the eductor, the venturi sucks the powder from the powder bag into the eductor.

In another exemplary embodiment, powder within the powder bag is caused to be drawn into the liquid by activating an auger that feeds the powder into the liquid.

Another exemplary embodiment further includes:

using the pump to pump the liquid mixture into a bioreactor container; and growing cells or microorganisms within the liquid mixture in the bioreactor container.

In a fourth independent aspect, a powder bag includes:

a collapsible bag that bounds a compartment and is comprised of one or more sheets of a polymeric film, the collapsible bag having a front face and an opposing face that extends between a first side and a spaced apart second side that both extend between an upper end and an opposing lower end, the upper end terminating at an upper edge and the lower end terminating at lower edge; and a tubular port is secured to the lower end of the collapsible bag, the tubular port bounds an opening that communicates with the compartment of the bag, wherein when the collapsible bag is inflated, the opening of the port has a central longitudinal axis that extends to the upper end of the collapsible bag and the collapsible bag has an asymmetrical configuration about the central longitudinal axis.

One exemplary embodiment further includes:

the first side of the collapsible bag having a maximum first distance from the central longitudinal axis measured orthogonal from the central longitudinal axis; and the second side of the collapsible bag having a maximum second distance from the central longitudinal axis measured orthogonal from the central longitudinal axis, the maximum second distance being at least 3, 4, 5, 6, 8, 10 or 12 times greater than the first maximum distance.

In another exemplary embodiment, the first side has a length extending between the upper edge and the opposing lower edge, at least 70%, 80%, 90%, or 95% of the length of the first side of the collapsible bag being linear.

In another exemplary embodiment, the linear length of the first side is disposed parallel to the central longitudinal axis.

In another exemplary embodiment, the second side has a length extending between the upper edge and the opposing lower edge, at least 30%, 40%, 50%, or 60% of the length of the second side of the collapsible bag being angled relative to the central longitudinal axis.

In another exemplary embodiment, the second side has a length extending between the upper edge and the opposing lower edge, at least 30%, 40%, 50%, or 60% of the length of the second side of the collapsible bag being angled or curved relative to the first side.

Another exemplary embodiment further includes a powder housed within the compartment of the powder bag, the powder comprising a powder media for growing cells or microorganism, a powder feed or nutrient for growing cells or microorganism, a powder reagent, a powder buffer, a powder hydrogel, or micro-beads on which adherent cells are grown.

In another exemplary embodiment, a clamp is removably clamped across the lower end of the collapsible bag so as to preclude the powder from passing out through the port.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
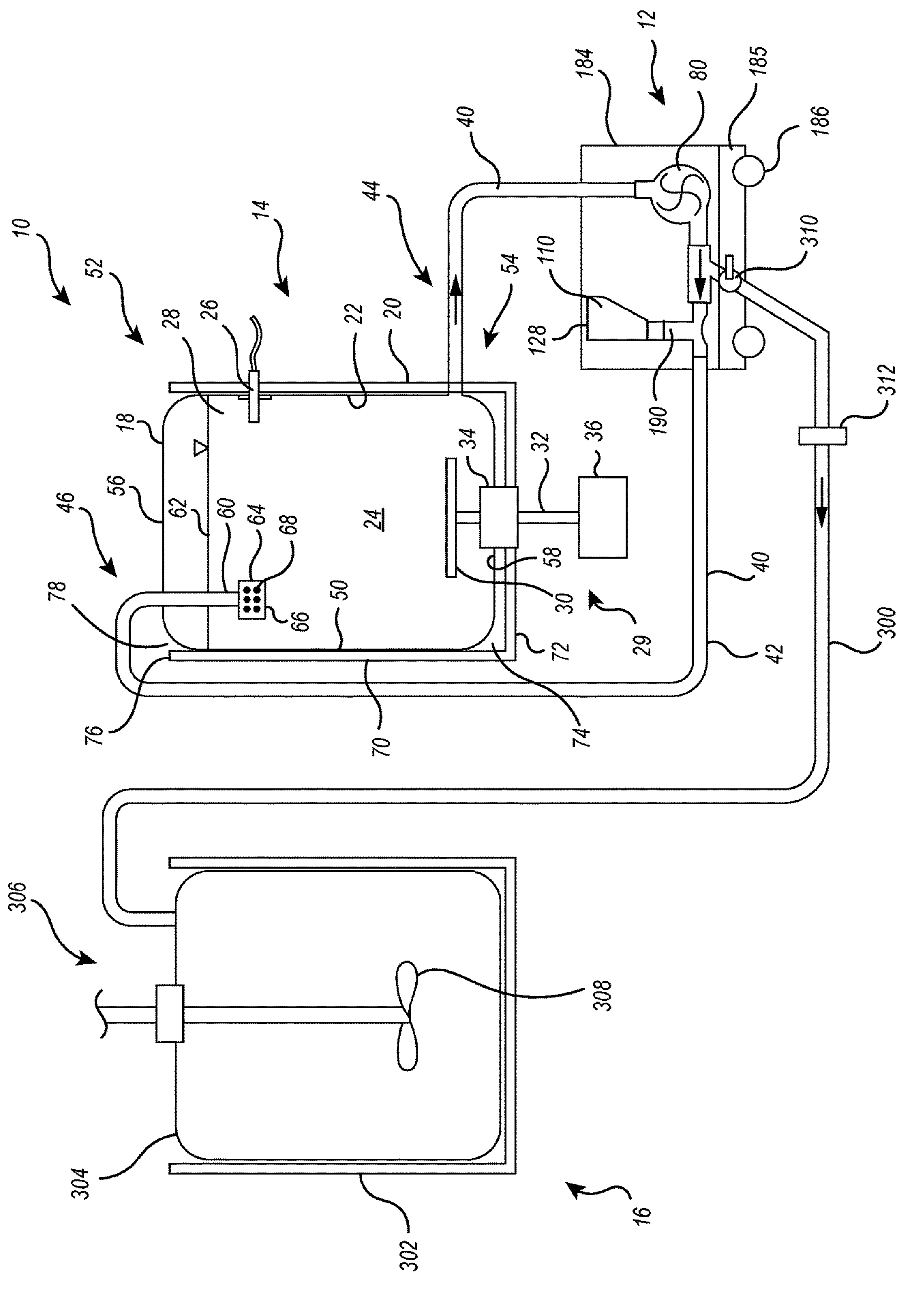
FIG. 1 is schematic depiction of an exemplary powder hydration system.

Before describing the present disclosure in detail, it is to be understood that this disclosure is not limited to particularly exemplified apparatus, systems, methods, or process parameters that may, of course, vary. It is also to be understood that the terminology used herein is only for the purpose of describing particular embodiments of the present disclosure and is not intended to limit the scope of the disclosure in any manner.

All publications, patents, and patent applications cited herein, whether supra or infra, are hereby incorporated by reference in their entirety to the same extent as if each individual publication, patent, or patent application was specifically and individually indicated to be incorporated by reference.

The term "comprising" which is synonymous with "including," "containing," or "characterized by," is inclusive or open-ended and does not exclude additional, unrecited elements or method steps.

It will be noted that, as used in this specification and the appended claims, the singular forms "a," "an" and "the" include plural referents unless the content clearly dictates otherwise. Thus, for example, reference to a "port" includes one, two, or more ports.

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the disclosure or claims.

Where possible, like numbering of elements have been used in various figures. Furthermore, multiple instances of an element and or sub-elements of a parent element may each include separate letters appended to the element number. For example, two instances of a particular element "10" may be labeled as "10A" and "10B". In that case, the element label may be used without an appended letter (e.g., "10") to generally refer to all instances of the element or any one of the elements. Element labels including an appended letter (e.g., "10A") can be used to refer to a specific instance of the element or to distinguish or draw attention to multiple uses of the element. Furthermore, an element label with an appended letter can be used to designate an alternative design, structure, function, implementation, and/or embodiment of an element. For example, two alternative embodiments of a particular element may be labeled as "10A" and "10B". In that case, the element label may be used without an appended letter (e.g., "10") to generally refer to all instances of the alternative embodiments or any one of the alternative embodiments.

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present. Furthermore, as used herein, the terms "connection," "connected," and the like do not necessarily imply direct contact between the two or more elements.

Various aspects of the present devices, systems, and methods may be illustrated with reference to one or more exemplary embodiments. As used herein, the term "embodiment" means "serving as an example, instance, or illustration," and should not necessarily be construed as required or as preferred or advantageous over other embodiments disclosed herein.

Unless defined otherwise, all technical and scientific terms used herein have the same meaning as commonly understood by one of ordinary skill in the art to which the present disclosure pertains. Although a number of methods and materials similar or equivalent to those described herein can be used in the practice of the present disclosure, the preferred materials and methods are described herein.

In general, the present disclosure relates to powder hydration systems and related methods for efficiently hydrating powers and/or otherwise efficiently mixing powders with a liquid. The system and methods are particularly designed for hydrating/mixing powders used in the biopharmaceutical industry, such as hydrating powder media used for growing cells and microorganisms. The powder hydration systems include unique powder mixing systems and unique powder bags that can be used with such mixing systems.

Depicted in FIG. 1 is one embodiment of an inventive powder hydration system 10 incorporating features of the present disclosure. In general, powder hydration system 10 comprises a powder mixing system 12 that is fluid coupled with a hydration tank assembly 14 and that is optionally fluid coupled to a reactor tank assembly 16. The various components of powder hydration system 10 will now be discussed in greater detail.

Hydration tank assembly 14 typically comprises a hydration container 18 supported within a rigid support housing 20. Rigid support housing 20 has an annular sidewall 70 that upstands from a floor 72 and that encircles a compartment 74. An upper end of sidewall 70 terminates at an annular lip 76 that encircles an access 78 to compartment 74. Hydration container 18 is disposed within compartment 74 so as to rest on floor 72 and be laterally supported by sidewall 70. Hydration container 18 has an interior surface 22 that bounds a chamber 24. In one embodiment, container 18 comprises a flexible, collapsible bag. For example, container 18 can be comprised of one or more sheets of a flexible, water impermeable polymeric film such as a low-density polyethylene. The polymeric film can have a thickness that is at least or less than 0.02 mm, 0.05 mm, 0.1 mm, 0.2 mm, 0.5 mm, 1 mm, 2 mm, 3 mm or in a range between any two of the foregoing. Other thicknesses can also be used. The film is sufficiently flexible that it can be rolled into a tube without plastic deformation and can be folded over an angle of at least 90°, 180°, 270°, or 360° without plastic deformation.

The film can be comprised of a single ply material or can comprise two or more layers that are either sealed together or separated to form a double wall container. Where the layers are sealed together, the material can comprise a laminated or extruded material. The laminated material comprises two or more separately formed layers that are subsequently secured together by an adhesive. One example of an extruded material that can be used in the present disclosure is the Thermo Scientific CX3-9 film available from Thermo Fisher Scientific. The Thermo Scientific CX3-9 film is a three-layer, 9 mil cast film produced in a cGMP facility. The outer layer is a polyester elastomer coextruded with an ultra-low density polyethylene product contact layer. Other materials can also be used.

It is appreciated that container 18 can be manufactured to have virtually any desired size, shape, and configuration. For example, container 18 can be formed having chamber 24 sized to 5 liters, 10 liters, 30 liters, 50 liters, 100 liters, 250 liters, 500 liters, 750 liters, 1,000 liters, 1,500 liters, 3,000 liters, 5,000 liters, 10,000 liters or other desired volumes. The size of chamber 24 can also be in the range between any two of the above volumes. In other embodiments, chamber 24 can have a larger or smaller volume.

More specifically, container 18 is defined as having an encircling sidewall 50 that extends between an upper end 52 and an opposing lower end 54. Upper end 52 terminates at a top end wall 56 that is commonly openly exposed while lower end 54 terminates a bottom end wall 58 supported on support housing 20. Although in the above discussed embodiment container 18 is described as a flexible, collapsible bag which is supported by support housing 20, in alternative embodiments it is appreciated that container 18 can comprise a rigid or semi-rigid container, such as comprised of metal, molded plastic or a composite. In this embodiment, support housing 20 may be eliminated as container 18 is self-supporting.

During operation, a liquid 28 is housed within chamber 24. The composition of liquid 28 can differ depending upon the intended use. In one embodiment, liquid can comprise water, filtered water, distilled water, deionized water, water for injection, or media for use in growing cells or microorganism. In some embodiments, liquid 28 can comprise a solution or a suspension.

As needed, one or more sensors 26 can be coupled with container 18 for detecting properties of the liquid 28, both initially and as it is later processed, as discussed below. By way of example and not by limitations, sensors 26 can comprise temperature probes, pH probes, $CO_2$ sensors, oxygen sensors, and the like.

In one embodiment of the present disclosure, mixing systems are provided for mixing a powder with liquid 28 within container 18. In the depicted embodiment, a mixing system 29 is provided having a movable mixing element 30 disposed within chamber 24 and configured for mixing liquid 28. In the depicted embodiment, mixing element 30 comprises a baffle coupled with a drive shaft 32. Drive shaft 32 couples with container 18 through a seal 34. A motor 36 is coupled with drive shaft 32 for reciprocally raising and lowering baffle 30 to facilitate mixing liquid 28. One example of this mixing assembly is disclosed in U.S. Pat. No. 6,908,223 issued Jun. 21, 2005, which is incorporated herein by specific reference. In other embodiments, mixing element 30 can comprise an impeller and motor 36 can be configured to rotate drive shaft 32 and the impeller.

In another embodiment, drive shaft 32 can project into container 18 through a flexible tube having one end rotatably connected to container 18 and an opposing second end connected to mixing element 30. Drive shaft 32 passes through the flexible tube and removably couples with mixing element 30 so that drive shaft 32 can rotate mixing element 30 without directly contacting liquid 28. Examples of this mixing system are disclosed in U.S. Pat. No. 7,384,783, issued Jun. 10, 2008 and U.S. Pat. No. 7,682,067, issued Mar. 23, 2010 which are incorporated herein by specific reference. Alternatively, mixing element 30 can comprise a magnetic stir bar or impeller disposed within chamber 24 of container 18 and rotated by a magnetic mixer disposed outside of container 18. In yet other embodiments, mixing element 30 can comprise a stir bar, paddle, or the like that projects into chamber 24 of container 18 and can be pivoted, swirled, shook or otherwise moved to mix liquid 28. Gas bubbles can also be passed through liquid 28 to achieve the desired mixing. Finally, support housing 20 and container 18 can be pivoted, rocked, rotated or otherwise moved so as to mix liquid 28 within container 18. Other conventional mixing techniques can also be used. Specific examples of how to incorporate a mixer into a flexible bag, such as container 18, are disclosed in U.S. Pat. No. 7,384,783, issued Jun. 10, 2008; U.S. Pat. No. 7,682,067, issued Mar. 23, 2010; and US Patent Publication No. 2006/0196501, issued Sep. 7, 2006 which are incorporated herein by specific reference.

With continued reference to FIG. 1, powder mixing system 12 comprises a conduit 40 that bounds a passage 42 and that extends between a first end 44 and an opposing second end 46. In the depicted embodiment, first end 44 of conduit 40 is fluid coupled with lower end 54 of container 18 while second end 46 is fluid coupled with upper end 52 of container 18. Conduit 40 can be coupled to container 18 by aseptic connectors or through other conventional coupling techniques. Although not required, in one embodiment, second end 46 of conduit 40 terminates at a terminal end 60 that is disposed within chamber 24. Terminal end 60 can be submerged or otherwise disposed below a top surface 62 of liquid 28. In one embodiment, an optional diffuser 64 is secured to terminal end 60 and disposed within liquid 28. Diffuser 64 comprises a housing 66 having a plurality of small hole 68 extending therethrough. Housing 66 is secured to terminal end 60 so that liquid 28 passing out through second end 46 of conduit 40 into chamber 24 must pass through holes 68. Each hole 68 is typically has a maximum diameter in a range between 0.15 mm and 0.7 mm and more commonly in a range between 0.2 mm and 0.6 mm or 0.3 mm and 0.5 mm. Other sized holes 68 can also be used depending upon the powder being mixed. In one embodiment, holes 68 have a circular configuration with diameters in the above ranges. In alternative embodiments, holes 68 can have different shapes but have corresponding cross sectional areas. Smaller holes 68 help to facilitate mixing of powder with liquid 28. However, if holes 68 are too small they can become clogged. The number of holes 68 formed on housing 66 can vary based on the size of housing 66. However, in some embodiments, the number of holes 68 formed on housing 66 can be at least or less than 10, 20, 30, 50, 75, 100, 150, 200 or in a range between any two of the foregoing.

In the embodiment depicted, terminal end 60 of conduit 40 projects into chamber 24 through top end wall 56. In alternative embodiments, terminal end 60 can project through sidewall 50 of container 18. In other embodiments, diffuser 64 can be mounted directly on interior surface 22 of container 18, such as on interior surface 22 of sidewall 50. Terminal end 60 can then be coupled to container 18 so as to communicate with diffuser 64.

Conduit 40 can be made of a rigid or semi-rigid piping and/or can be made of a flexible hose or tubing. In one typical embodiment, conduit 40 can be comprised of different sections that are secured together with the different sections being made of different materials. For example, some sections can be more flexible than other sections. Furthermore, conduit 40 need not be formed as one continuous member that extends between opposing ends 44 and 46. For example, as discussed below, various components, such as a pump or eductor, can be spliced into or formed in-line with conduit 40 at different locations along conduit 40. Furthermore, the diameter of passage 42 bounded by conduit 40 can vary at different locations along conduit and can vary dependent upon the application and intended use. However, to achieve efficient mixing and processing, the diameter of passage 42 is typically at least 1 cm, 1.5 cm, 2 cm, 3 cm, or 5 cm, or is in a range between any two of the foregoing.

Powder mixing system 12 also includes a fluid pump 80 that is coupled with conduit 40. Pump 80 is typically disposed at a location between opposing ends 44 and 46 of conduit 40 and is configured such that during operation, pump 80 continuously draws liquid 28 that is within container 18 into first end 44 of conduit 40. Liquid 28 is then pumped along conduit 40 until is passes out through second end 46 and back into container 18, thereby forming a continuous loop. Pump 80 can comprise any fluid pump that will not contaminate liquid 28 and can achieve desired flow rates. In one embodiment, pump 80 is a centrifugal pump. The desired flow rate again depends upon and size and application for the system. However, in one embodiment to achieve efficient mixing and processing, the flow rate through pump 80 is typically in a range between 5 liters/min. to 200 liters/min. with between 20 liters/min. to 150 liters/min. or between 60 liters/min. to 120 liters/min. being more common.

Figure 2:
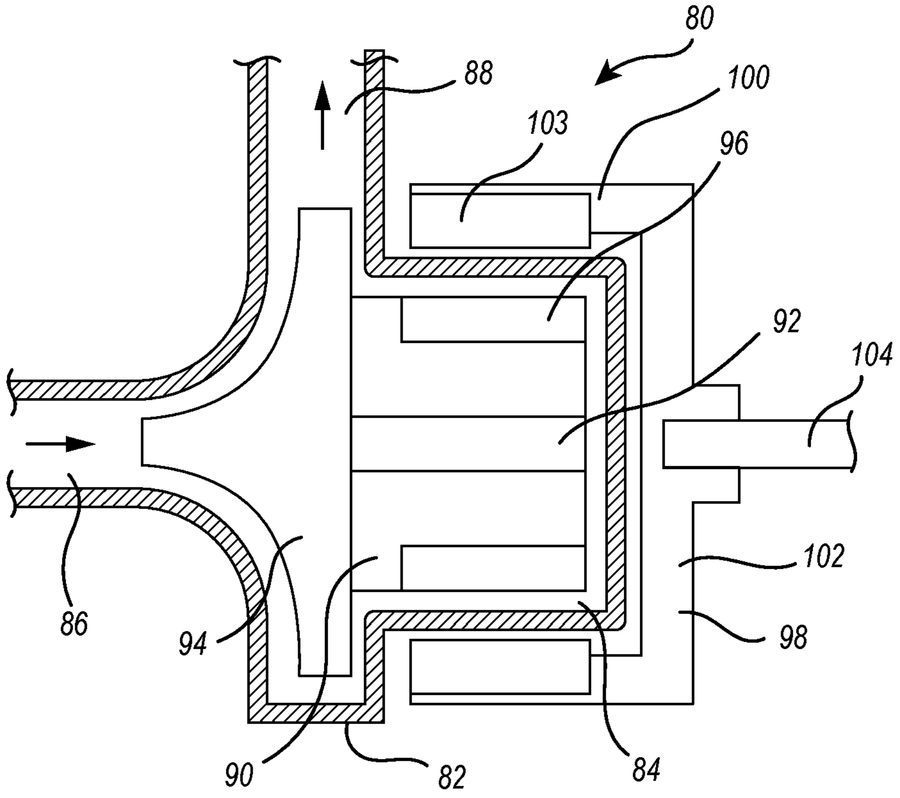
FIG. 2 is a cross sectional side view of an exemplary magnetic pump that can be used in the systems herein disclosed, including the system of FIG. 1.

In one embodiment, powder mixing system 12 can be designed as a disposable system, thereby avoiding the need for cleaning and/or sterilization between uses. In this application, a magnetically driven pump can achieve desired benefits of helping to form a closed and potentially sterile system where parts of the pump that contact liquid 28 can be disposed of and replaced in a cost efficient manner. For example, depicted in FIG. 2 is one example of a magnetic pump 80. Pump 80 includes a housing 82 that bounds a cavity 84 having an inlet opening 86 and an outlet opening 88. A rotor 90 is rotatably disposed within cavity 84. Rotor 90 includes a spindle 92, an impeller 94 secured to the end of spindle 92, and rotor magnet(s) 96 disposed laterally about spindle 92. Rotatably disposed outside of housing 82 is a magnetic driver 98. Magnetic driver 98 includes a sleeve 100 that encircles a portion of housing 82 adjacent to rotor magnet(s) 96 and that has driver magnet(s) 103 disposed thereon. A base 102 is secured to sleeve 100 with a drive shaft 104 extending therefrom. During operation, a motive force rotates draft shaft 104 which rotates driver magnet(s) 103 about housing 82. In turn, driver magnet(s) 103 produce a magnetic force on rotor magnets 96 which rotates rotor 90, including impeller 94, within housing 82. As impeller 94 rotates, liquid 28 is drawn in through inlet opening 86 and pumped out through outlet opening 88, thereby achieving the circulation of liquid 28 as previously discussed. Upon completion of use, housing 82 with rotor 90 therein can be disposed of. However, magnetic driver 98 with the related motive force and be reused with a new housing 82 and rotor 90. Since magnetic driver 98 does not contact liquid 28, no cleaning or sterilization is required.

Also provided herein are systems and methods for the management of powder that can form a portion of powder mixing system 12. In some embodiments, the systems include a closed-system powder delivery system including an asymmetric powder bag, a single-use hopper, a powder hopper lid with at least one powder port, a quick-release tri-clamp for swapping out powder bags and a single-use powder feed valve. In some embodiments, the system may include a hopper integrated with a tri-clamp gasket. In some embodiments, the powder hopper lid includes at least one tri-clamp powder port.

Figure 3:
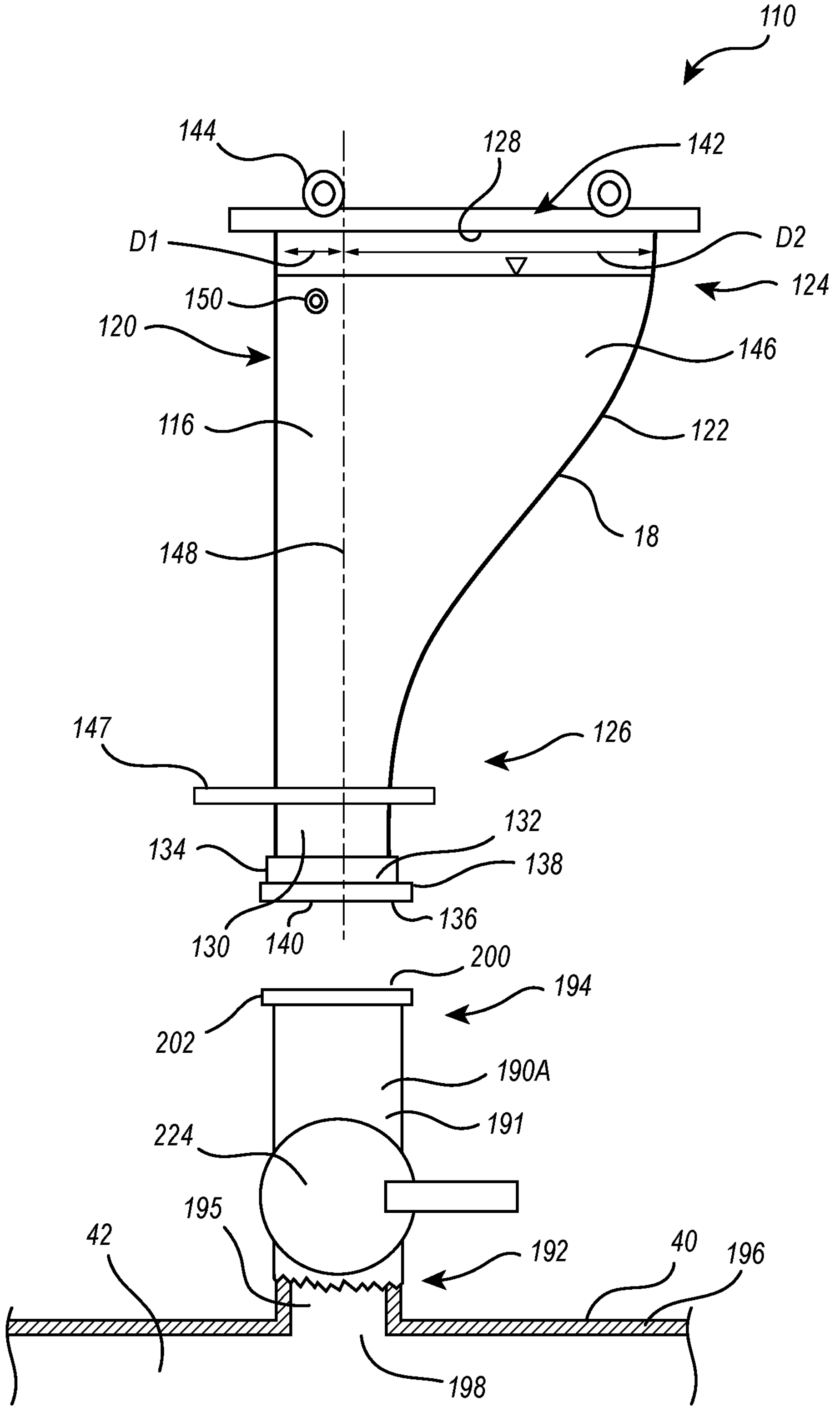
FIG. 3 is an elevated side view of an exemplary powder bag used with an exemplary transfer member.
Figure 4:
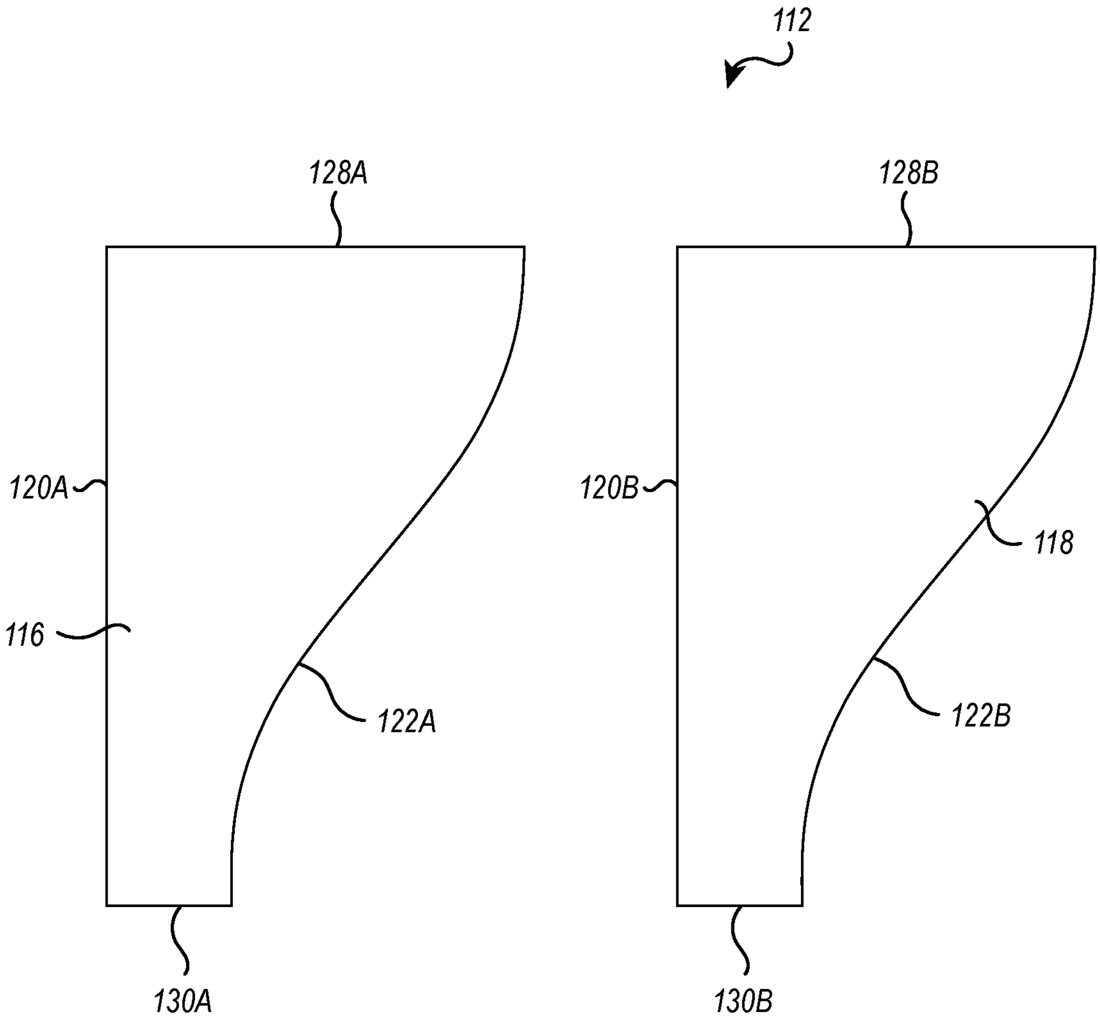
FIG. 4 is an elevated side view of exemplary panels used in the formation of exemplary powder bag shown in FIG. 3.

More specifically, a powder bag 110 can also fluid coupled with conduit 40. Turning to FIG. 3, powder bag 110 comprises a collapsible bag 112 that bounds a compartment 114. In one embodiment, collapsible bag 112 is a two-dimensional bag having a front panel 116 and an opposing back panel 118 that laterally extend between a first side 120 and a spaced apart second side 122 and that vertically extend between an upper end 124 and an opposing lower end 126. Upper end 124 terminates at an upper edge 128 and lower end 126 terminates at a lower edge 130. More specifically, as shown in FIG. 4, in one embodiment, collapsible bag 112 can be comprised of front panel 116 and back panel 118 that are separate but that have the same or substantially the same configurations and are overlayed. Panels 116 and 118 can be comprised of sheets of a flexible, water impermeable polymeric film. The film used to form collapsible bag 112 can be the same materials having the same properties, dimensions, and alternatives as previously discussed above with regard hydration container 18. During assembly, first side edges 120A and 120B of panels 116 and 118 are welded together, such as by adhesive, heat welding, ultrasonic welding or the like, to form first side 120. Similarly, second side edges 122A and 122B are welded together to form second side 122 while upper edges 128A and 128B are welded or are otherwise secured together to form upper edge 128A. In one alternative embodiment, collapsible bag 112 can be formed of one sheet of polymeric film that is folded over on top of itself. In this embodiment, the central fold can comprise first side 120 while the opposing free ends that are welded together can comprise second side 122.

Returning to FIG. 3, powder bag 110 also includes a tubular port 132 secured to lower end of collapsible bag 112. Tubular port 132 includes a tubular sleeve 134 that terminates at an end face 136. An annular flange 138 encircles and radially outwardly projects from sleeve 134 adjacent to end face 136. Tubular sleeve 134 encircles an opening 140 extending therethrough. Lower edges 130A and 130B of panels 116 and 118 (FIG. 4) are welded to sleeve 134 so as to obtain a liquid tight seal therebetween. In this assembly, opening 140 communicates with compartment 114 of collapsible bag 112.

After and/or during formation of powder bag 110, a powder 146 can be disposed into compartment 114. For example, powder 146 can be dispensed into compartment 114 either through port 132 or through upper end 124 prior to sealing closed. In some embodiments, powder bag 110 may have a resealable closure 142 at upper edge 128. Resealable closure 142 may be any suitable closure for preventing contamination of the inside of powder bag 110. For example, resealable closure 142 can be a zip-lock type closure, a hook and eye type closure or a clamp type closure. Once powder 146 has been added to the powder bag 110, closure 142 and upper end 124 can heat sealed or otherwise permanently welded, if needed, to ensure complete closure of the powder bag 110. In some embodiments, hangers 144 can be secured to upper end 124, such as to closure 142, for supporting the upper end of powder bag 110 by a support apparatus.

Powder 146 can be any powder that is desired to be mixed with liquid 28. For example, powder 146 can comprise a powder media for growing cells or microorganism, a powder feed or nutrient for use with growing cells or microorganism, a powder reagent, a powder buffer, a powder hydrogel, micro-beads on which adherent cells are grown, or combinations thereof. Thus, powder 146 can be soluble or non-soluble in water. Other powders can also be used. Either prior to or after dispending powder 146 into compartment 114 of powder bag 110, a removable clamp 147 is typically secured across lower end 126 of collapsible bag 112 so as to seal powder 146 from port 132.

In one embodiment, one or more ports 150 can also be formed at upper end 124 of powder bag 110 such as on front panel 116 and/or back panel 118. The one or more ports 150 can be used for coupling a liquid source to powder bag 110 for washing any remnant powder 146 out of powder bag 110 or for applying a gas source to powder bag 110 so that a gas pressure produced within compartment 114 can be used to help inflate or keep powder bag 110 inflated and facilitate the flow of powder 146 out of powder bag 110. One or more ports 150 can also be used for applying a negative pressure to compartment 114 and for applying a gas filter that can enable gas to escape from powder bag 110.

Powder bag 110 can be specifically configured so that it can achieve a number of unique benefits. As shown in FIG. 3, powder bag 110 can be asymmetric. The asymmetric powder bag 110 may include a second side 122 that has a curvature. First side 120 may be flat as shown. Alternatively, first side 120 may have a curvature. However, the curvature of first side 120 is preferably different from the curvature of the second side 122. More specifically, with reference to FIG. 3, when collapsible bag 112 is inflated, opening 140 of port 132 has a central longitudinal axis 148 that extends between upper end 124 and lower end 126. In the depicted embodiment, collapsible bag 112 has an asymmetrical configuration about central longitudinal axis 148. Here it is evident that second side 122 outwardly tapers away from central longitudinal axis 148 as it extends from lower end 126 to upper end 124. In contrast, first side 120 extends generally parallel to central longitudinal axis 148 at close proximity to central longitudinal axis 148 as first side 120 extend from lower end 126 to upper end 124. During operation, powder bag 110 is vertically suspended from upper edge 128 so that powder 146 naturally flows under gravity toward port 132. As powder 146 flows down along second side 122, powder 146 flows both vertically downward and laterally inward toward central longitudinal axis 148. In contrast, as powder 146 flows down along first side 120, powder 146 flows primarily only in a vertical direction. The disclosed shape of powder bag 110 has been found to improve the flow of powder 146 out through port 132, i.e., decrease powder clogging, and decrease the force needed to overcome powder clogging, as compared to powder bags that are symmetrical about central longitudinal axis 148, (e.g., first side 120 outwardly flares the same as second side 122). The improved flow characteristics are a result of eliminating or minimizing opposing lateral flows of powder 146 that may increase powder clogging.

Furthermore, the new shape of powder bags 110 enables ergonomic nesting of filled powder bags 110 within a shipping box, e.g., alternating filled powder bags 110 can be inverted and nested next to each other to form a generally square configuration that produces efficient packing within shipping boxes. Finally, as will be discussed below in more detail, the disclosed design enables multiple powder bags 110 to be simultaneously coupled to a platform in close proximity by aligning the bags' 110 first sides 120, thereby enabling multiple powder bags 110 to be used for dispensing powder in a relatively small space. Other advantages also exist. Although advantages exist when using the disclosed asymmetrical bags, it is appreciated that conventional symmetrical powder bags can also be used in the exemplary systems herein disclosed.

In one embodiment, first side 120 of collapsible bag 112 has a maximum first distance D1 from central longitudinal axis 148 measured orthogonal from the central longitudinal axis 148. Second side 122 of collapsible bag 112 has a maximum second distance D2 from central longitudinal axis 148 measured orthogonal from central longitudinal axis 148 that is greater than first distance D1. In one alternative embodiment, maximum second distance D2 is at least 3, 4, 5, 6, 8, 10 or 12 times greater than first maximum distance D1 or is in a range between any two of the foregoing numbers.

In one embodiment, first side 120 has a length extending between upper edge 128 and opposing lower edge 130. In this embodiment, at least 70%, 80%, 90%, or 95% of the length of first side 120 linear. In another embodiment, the linear length of the first side 120 is disposed parallel to central longitudinal axis 148.

In another embodiment, second side 122 has a length extending between the upper edge 128 and opposing lower edge 130. In this embodiment, at least 30%, 40%, 50%, or 60% of the length of second side 122 is angled, sloped or curved relative to central longitudinal axis 148. In the depicted embodiment, second side 122 curves as it tapers away from central longitudinal axis 148. In alternative embodiments, second side 122 could be configured to have multiple linear sections that connect end to end or could comprise a combination of curved and linear sections.

Figure 5:
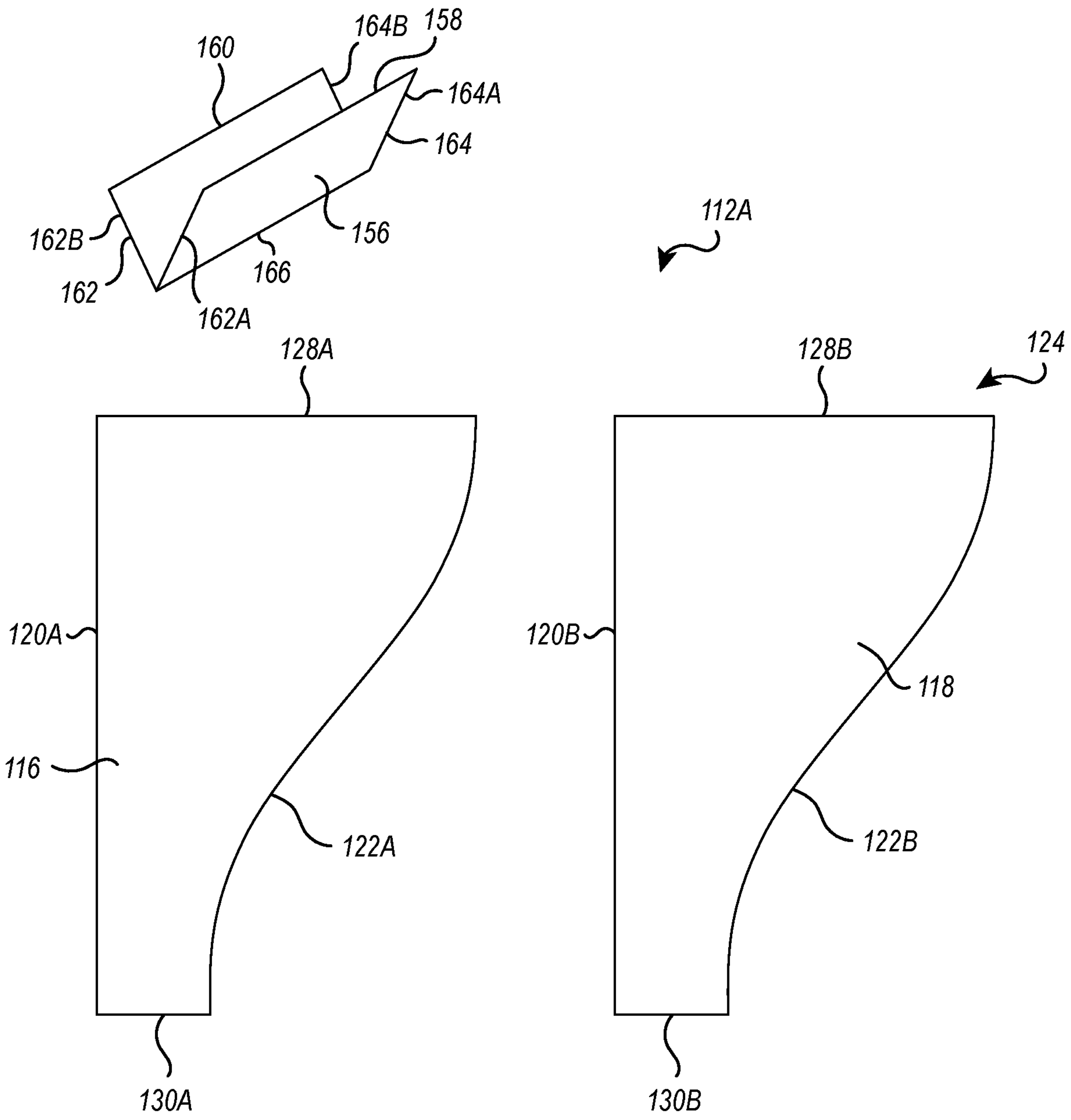
FIG. 5 is a front view of exemplary panels used in the formation of an exemplary three-dimensional powder bag.

In an exemplary embodiment, powder bag 110 or collapsible bag 112 can be formed as a 3-dimensional bag. For example, as depicted in FIG. 5, a collapsible bag 112A can again be formed using front panel 116 and back panel 118 as described above. However, in contrast to directly connecting together upper edges 128A and 128B to form upper edge 128, a top panel 156 can be secured between front panel 116 and back panel 118 at upper end 124. In one embodiment, top panel 156 has a front edge 158 and an opposing back edge 160 that both extend between a first side edge 162 and an opposing second side edge 164. Top panel 156 can be folded along a fold line 166 that centrally extends between first side edge 162 and an opposing second side edge 164. Fold line 166 divides first side edge 162 into a front side edge portion 162A and a back side edge portion 162B. Likewise, fold line 166 divides second side edge 164 into a front side edge portion 164A and back side edge portion 164B. During assembly, front edge 158 is welded to upper edge 128A, back edge 160 is welded to upper edge 128, front side edge portion 162A is welded to the upper end of first side edge 120A, back side edge portion 162B is welded to the upper end of first side edge 120A, front side edge portion 164A is welded to the upper end of second side edge 122A, and back side edge portion 164B is welded to the upper end of second side edge 122B.

Once assembled, top panel 156 unfolds as collapsible bag 112A is expanded. In this embodiment, upper edge 128 is now the weld line formed between panels 116, 118 and top panel 156. In alternative embodiments, it is appreciated that top panel 156 can have a variety of different configurations and can be attached using a variety of different methods. All of the above discussion with regard to powder bag 110/collapsible bag 112, including benefits and alternatives, is also applicable to collapsible bag 112A. Furthermore, all future discussions of powder bag 110/collapsible bag 112 are also applicable to and intended to encompass collapsible bag 112A.

Figure 6:
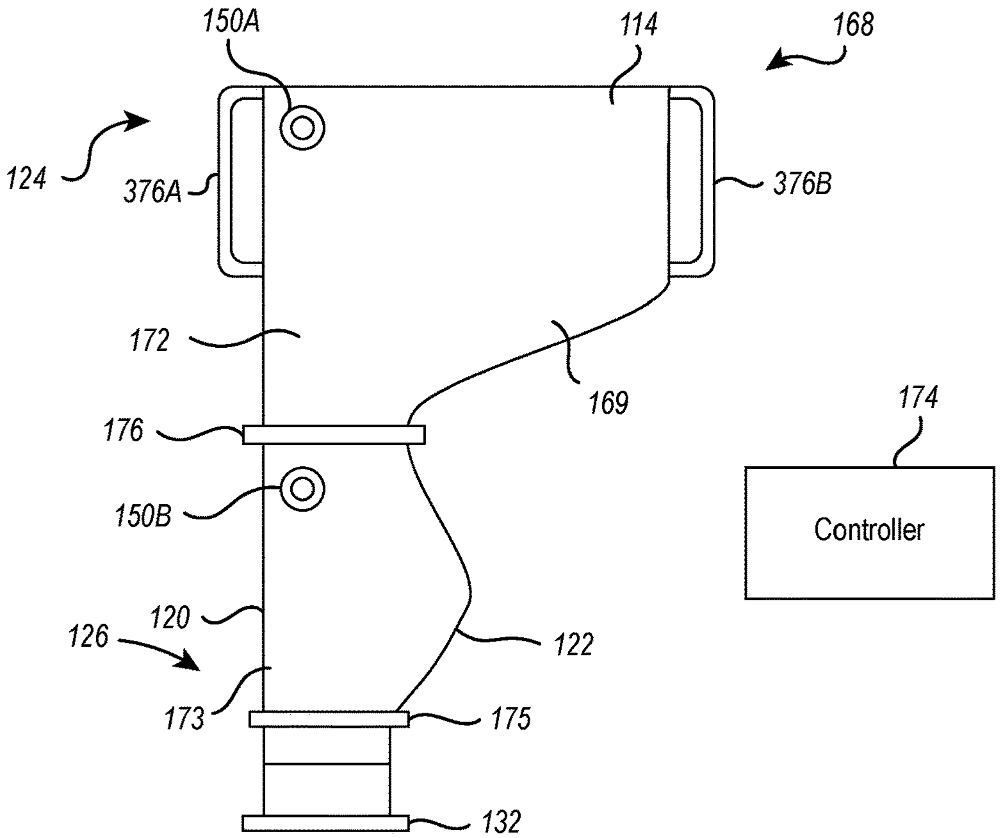
FIG. 6 is an elevated front view of an exemplary powder bag having an airlock chamber.

In one alternative embodiment, powder bag 110/collapsible bag 112 can also be formed with an airlock to assist in better controlled and sterilized movement of powder 146. For example, turning to FIG. 6, powder bag 168 is provided wherein like elements between powder bags 168 and 110 are identified by like reference characters. Powder bag 168 includes a collapsible bag 169 which can be either a 2- or 3-dimensional bag, as previously discussed, and can be formed from the same materials and methods as previously discussed with regard to collapsible bag 112 and hydration container 18. Collapsible bag 169 is elongated relative to collapsible bag 112 and includes first side 120 and opposing second side 122 extending between upper end 124 and lower end 126. Because of the elongation of collapsible bag 169, it may be ergonomically favorable to have handles 376A and 376B formed on opposing sides 120 and 122 of collapsible bag 169.

Extending across the faces of collapsible bag 179 between side 120 and 122 is a lower pinch clamp 175 disposed toward port 132 and an upper pinch clamp 176 spaced upward and apart from lower pinch clamp 175. Pinch clamps 175 and 176 can be manual or automated and can comprise pneumatic pinch clamps (spring fail safe), pneumatic pinch clamps (vacuum assist) or motor (servo) actuated pinch clamps. Pinch clamps 175, 176 divide compartment 114 of collapsible bag 169 into a primary chamber 172 disposed above upper pinch clamp 176 and an airlock chamber 173 disposed between pinch clamps 175 and 176. Airlock chamber 173 with pinch clamps 175 and 176 help to regulate flow of powder 146 and regulate pressure between zones. Second side 122 of airlock chamber 173 can outwardly bulge, i.e., have a "bellied geometry" so as to increase the volume of airlock chamber 173 and increase better filling compliance. In one embodiment, one or more ports 150A can be mounted on collapsible bag 169 so as to communicate primary chamber 172 and/or one or more ports 150B can be mounted on collapsible bag 169 so as to communicate airlock chamber 173. In one embodiment, pinch clamps 175, 176 are electronically operated by a controller 174 and can pinch closed so as to seal collapsible bag 170 closed along the line of their placement. That is, with pinch clamps 175, 176 closed, powder 146 is precluded from passing thereby. In turn, pinch clamps 175, 176 can be selectively opened by controller 174 to a desired extent so as to permit powder 146 to flow therethrough at a desired rate.

During use, as will be discussed below in more detail, port 132 of powder bag 168 is coupled to a tubular transfer member while the upper end is vertically supported. Pinch clamps 175 and 176 are in the closed position and all of powder 146 is retained within primary chamber 172. Controller 174 is used to selectively open upper pinch clamp 176 until a predetermined amount of powder 146 flows into airlock chamber 173. Upper pinch clamp 176 is then closed. As previously discussed, primary chamber 172 can be pressurized by injecting a gas into primary chamber 172 through port 150A. The gas pressure assists in keeping powder bag 168 inflated and can assist in the flow of powder 146 into airlock chamber 173. The gas pressure can further assist in pressuring airlock chamber 173. It can be desirable to keep powder bag 168 inflated since the collapsing of powder bag 168 against powder 146 can hinder the flow of powder 146. Alternatively or in combination with pressurizing primary chamber 172, airlock chamber 173 can be pressurized by injecting a gas into airlock chamber 173 through port 150B to help flow of powder 146 both into airlock chamber 173 and out of airlock chamber 173 through the transfer member. Gas pressure inside chambers 172 and 173 can be regulated by supply of a low pressure supply gas.

Applying a vacuum can also assist in movement of powder between or from chambers 172 and/or 173. The pressures are typically in a range between +5 mbar to −5 mbar, regulated by an automated controller. In other embodiments, the positive pressure can be applied and/or maintained in a range between 3 mbar to 35 mbar with between 3 mbar and 25 mbar or between 3 mbar and 15 mbar being more common. Other pressures can also be used. In one embodiment, gas pressure can be sensed by a single use sensor, reusable sensor (as a pilot line), or by a load cell (pressing against bag). A gas filter may be desirable on the gas supply/vacuum line connected to ports 150. The lines can be small diameter ~¼" (6.35 mm) and can be manifolded for multiple purposes, e.g., filling gas, evacuating gas, adding rinse liquid, draining liquid.

Once powder 146 is transferred into airlock chamber 173 and upper pinch clamp 176 is closed, lower pinch clamp 175 can be selectively opened through the use of controller 174 so as to permit powder 146 to flow out of airlock chamber, through the transfer member and into conduit 40. The above process can then be repeated for another quantity of powder 146 within primary chamber 172. This progressive dispensing of small quantities of powder 146 permits increased control of a defined flow rate into conduit 40. That is, due to volume, weight and particle packing, the flow rate of powder out of primary chamber 172 under the force of gravity, is typically less controlled than the flow rate of the small quantity of powder 146 out of airlock chamber 173.

Figure 7:
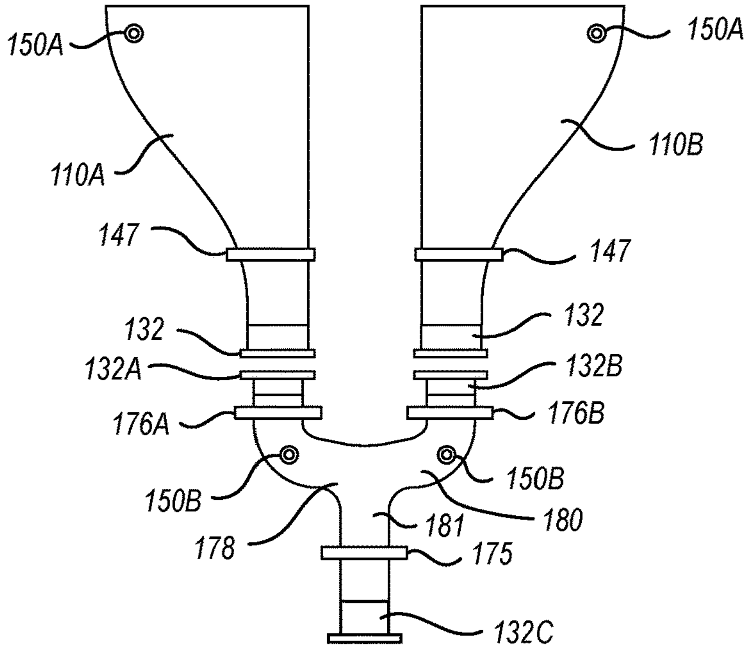
FIG. 7 is an elevated front view of exemplary powder bags used with exemplary secondary bag assembly that bounds an airlock chamber.

In powder bag 169, airlock chamber 173 is formed as a portion of single, continuous collapsible bag 169. In one alternative embodiment, however, airlock chamber 173 can be formed as part of a secondary bag that is separate from but selectively connected to a powder bag. For example, depicted in FIG. 7 are powder bag 110A and 110B, as previously discussed, that can be selectively coupled to a secondary bag 178. Secondary bag 178 comprises a collapsible bag 180 that bounds an airlock chamber 181 and that can be made of the same polymeric films as previously discussed with regard to collapsible bag 112 and hydration container 18. Although not required, in this embodiment collapsible bag 180 is Y-shaped having two ports 132A and 132B mounted at the upper end and one port 132C mounted at lower end. Upper pinch clamps 176A and 176B extend across collapsible bag 180 adjacent to port 132A and 132B, respectively, while a lower pinch clamp 175 extends across collapsible bag 180 adjacent to port 132C. During use, port 132 of powder bag 110A can be coupled to port 132A by a clamp 204 (FIG. 9), as will be discussed below in greater detail, while port 132 of powder bag 110B can be coupled to port 132B by clamp 204. In addition, port 132C is coupled to a tubular transfer member. With pinch clamps 175 and 176 closed, clamps 147 can be removed from powder bags 110A and 110B. Pinch clamps 176A and 175 can then be opened and closed as discussed above with regard to powder bag 168 to control flow of powder 146 out of powder bag 110A in small batch quantities. In turn, once powder bag 110A is empty, pinch clamps 176B and 175 can then be opened and closed as discussed above with regard to powder bag 168 to control flow of powder 146 out of powder bag 110B in small batch quantities.

As previously discussed, once powder bags 110A and 110B are empty, a fill line connected to ports 150A can be used to wash off any residual powder 146 from the interior surface of the powder bags 110. However, it can be undesirable to wet airlock chamber 181 as it may gum up the flow of powder 146 that may follow later. To remove liquid, a liquid drain line could be connected to one of ports 150A or connected to a port located at the lower ends of powder bags 110. The liquid carrying the residual powder could then be gravity drained from the chambers thereof by manipulation of powder bags 110 and separately dispensed into conduit 40 or hydration container 18.

In view of the foregoing, it is appreciated that various forms of powder bags and combinations of powder bags with secondary bags bounding airlock chambers can be used in the present systems. Although the below disclosure primarily references the use of powder bags 110, it is appreciated that all references to powder bags 110 is also intended to encompass use of all other powder bags disclosed herein or combination of powder bags with secondary bags housing an airlock chamber.

As noted above, the present disclosure also includes various forms to tubular transfer members that are used for fluid coupling powder bag 110 housing powder 146 to conduit 40. Depicted in FIG. 3 is one embodiment of a tubular transfer member 190A that includes a tubular stem 191 having a first end 192 and an opposing second end 194 with a passage 195 extending therebetween. Conduit 40 is shown having a sidewall 196 that encircles passage 42. A side opening 198 passes through sidewall 196 so as to communicate with passage 42. First end 192 of stem 191 is disposed on sidewall 196 so that passage 195 communicates with passage 42 through opening 198. In one embodiment, transfer member 190A/stem 191 projects vertically upward from conduit 40. This orientation assists in the free flow of powder 146 under gravitational force from powder bag 110, through transfer member 190A/stem 191 and into conduit 40. It is appreciated that transfer member 190A/stem 191 can be integrally formed with conduit 40 or can be secured thereto by welding, threaded connection, clamp, fastener, or other conventional techniques. In this embedment, the transfer member is mounted directly on conduit 40 to facilitate fluid communication therebetween. In alternative embodiments discussed below, however, the transfer member may not couple directly with conduit 40 but rather assists in forming an indirect fluid communication between powder bag 110 and conduit 40.

Figure 8:
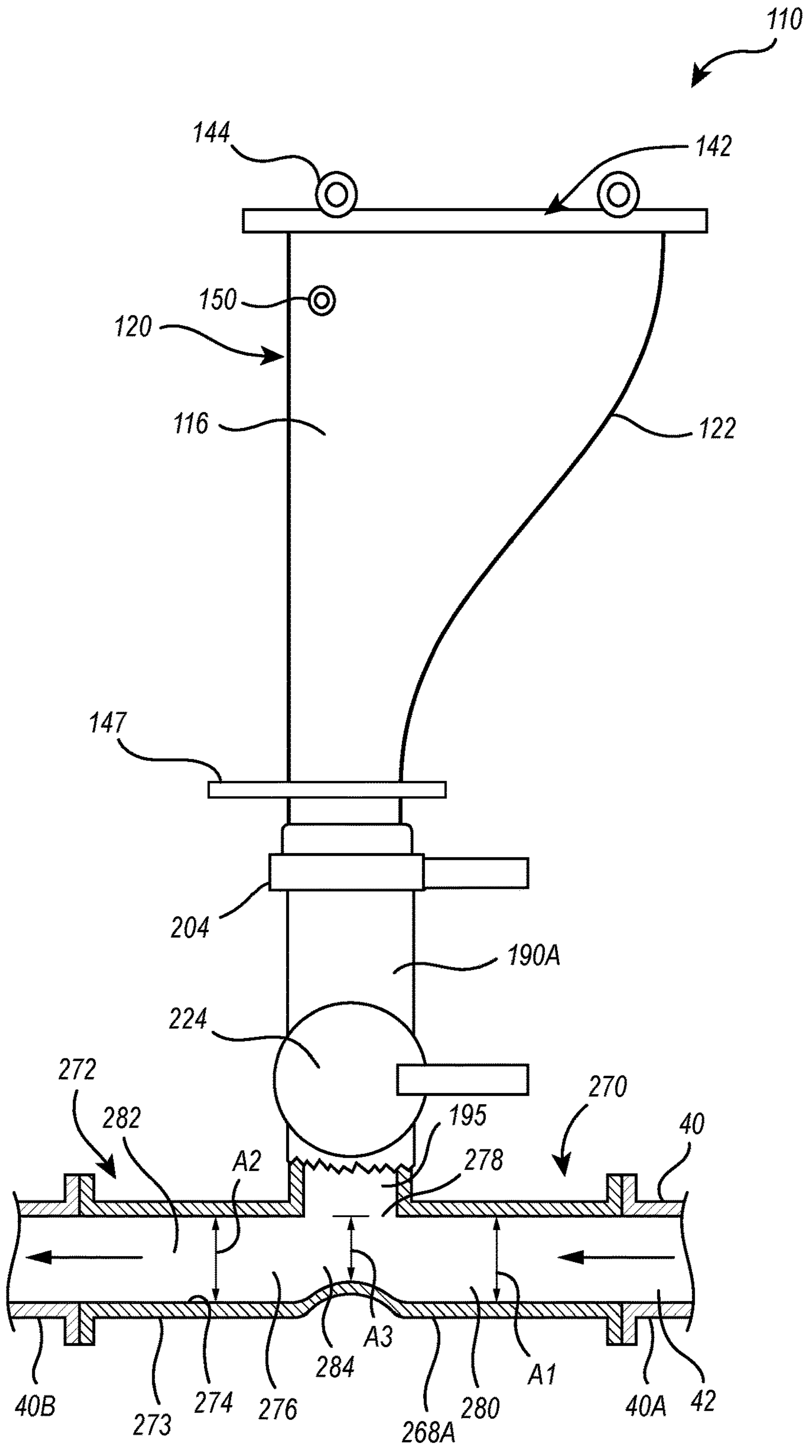
FIG. 8 is an elevated side view of the exemplary powder hydration system shown in FIG. 3 in an assembled condition and using an eductor.
Figure 9:
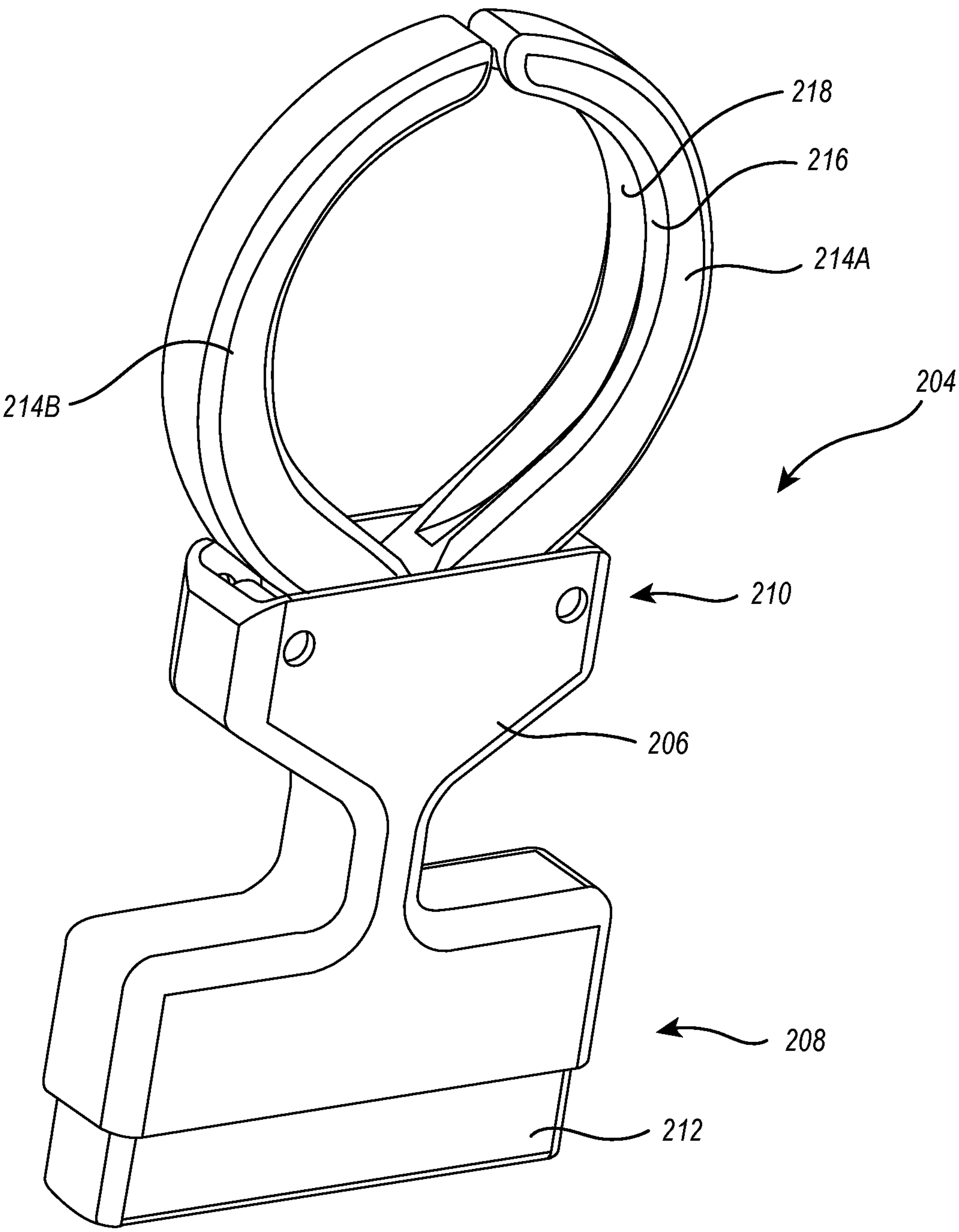
FIG. 9 is a perspective view of an exemplary clamp that can be used in the exemplary powder hydration system of FIG. 8.

Second end 194 of stem 191 terminates at an end face 200. An annular flange 202 encircles and radially outwardly projects from stem 191 adjacent to end face 200. Flange 202 has a configuration identical or comparable to flange 138 on powder bag 110. Thus, powder bag 110 can be coupled to transfer member 190A by mating end faces 136 and 200 together and then securing a clamp 204 around flanges 138 and 202 (FIG. 8). Clamp 204 forms a sealed connection between powder bag 110 and transfer member 190A through which powder 146 can flow. In one embodiment, clamp 204 can comprise tri-clamp, although other clamps can also be used. Depicted in FIG. 9 is one example of clamp 204 in the form of a quick release tri-clamp. Clamp 204 includes a handle 206 having a first end 208 and an opposing second end 210. A plunger 212 is disposed at first end 208 and is configured to resiliently press into first end 208. A pair of C-shaped clamp arms 214A and 214B are disposed at send end 210 of handle 206. Each clamp arm 214 has an interior surface 216 with a tapered slot 218 formed thereon. Tapered slots 218 are configured to receive adjacently disposed flanges 138 and 202 (FIG. 3).

During use, plunger 212 is depressed into handle 206 which causes clamp arms 214 to open by pivoting away from each other. Clamp arms 214 are then placed around mated flanges 138 and 202 so that flanges 138 and 202 are received within tapered slots 218. Plunger 212 is then released, which then causes clamp arms 214 to resiliently return toward the original closed position to secure flanges 138 and 202 together and form a sealed connection between powder bag 110 and transfer member 190A. One of the benefits of using clamp 204 is that it is quick and easy to secure powder bag 110 and to replace powder bag 110 with new powder bag 110 once powder 146 has been removed. In alternative embodiments, however, flanges 138 and 202 and/or clamp 204 can be replaced with other mechanisms for securing powder bag 110 to transfer member 190A. By way of example, powder bag 110 can be secured to transfer member 190A by threaded connection, press fit connection, lure lock connection, bayonet connection, slip fit connection, and/or through the use of conventional fasteners.

Returning to FIG. 3, in one embodiment, a valve 224 can also be associated with transfer member 190A. Valve 224 can be moved between an open position where powder 146 can freely flow through passage 195 of transfer member 190A or a closed position where powder 146 is blocked from passing through passage 195. Valve 224 can have a variety of different configurations and can be manual or electric. For example, valve 224 can ball valve, guillotine valve, solenoid valve, gate valve or the like.

Returning to FIG. 1, in one embedment, powder mixing system 12 can further comprises a stand 184 on which powder bag 110, pump 80 and/or portions of conduit 40 can be supported. In one optional embodiment, stand 184 can be disposed on a cart 185 having wheels 186 so that stand 184 can be easily, manually moved.

With continued reference to FIGS. 1 and 3, during one method of use, powder mixing system 12 is moved or otherwise positioned adjacent to hydration tank assembly 14/hydration container 18. First end 44 and second end 46 of conduit 40 are then fluid coupled with hydration container 18. Liquid 28 is dispensed into hydration container 18 to a predetermined level. Powder bag 110 is coupled with transfer member 190, as previously discussed with the upper end of powder bag being supported by stand 184. One of the benefits of one embodiment of the present disclosure is that powder bags 110 are not required to be positioned above hydration container 18 for dispensing powder 146 into liquid 28. Rather, powder bags 110 can be easily mounted to transfer member 190A while standing at ground level. This unique design eliminates the need for scaffolding or other access structure needed for an individual to gain access to upper end 52 of hydration tank assembly 14 for positioning and coupling the powder bag and eliminates the need for mechanical lifts to lift the powder bags to above upper end 52 of hydration tank assembly 14.

In an exemplary embodiment, when powder bag 110 is coupled to transfer member 190A and supported, powder bag 110 is completely disposed at an elevation lower than top end wall 56 hydration container 18 and/or annular lip 76 of support housing 20. In another embodiment, when powder bag 110 is coupled to transfer member 190A and supported, upper edge 128 of powder bag 110 is disposed at an elevation that is at least 0.3 meters, 0.6 meters, 1 meter, 1.5 meters, or 2 meters lower than top end wall 56 of hydration container 18 and/or annular lip 76 of support housing 20. In another embodiment, when powder bag 110 is coupled to a transfer member 190A and supported, upper edge 128 of powder bag 110 is disposed at an elevation that is less than 2.5 meters, 2 meters, 1.5 meters, or 1 meter from the ground surface on which hydration tank assembly 14 is supported. In yet another alternative embodiment, when powder bag 110 is coupled to transfer member 190A and supported, the entirety of powder bag 110 is laterally spaced apart from hydration container 18 so as to not be in vertical alignment therewith. The above positioning of powder bag 110 can be used in other mounting arrangements on other transfer members disclosed herein.

Prior to or after coupling powder bag 110 to transfer member 190A, pump 80 is activated so that liquid 28 is continuously circulated from hydration container 18, through conduit 40 and back into hydration container 18. Mixing system 29 is also activated to mix liquid 28 within hydration container 18. With liquid 28 pumping through conduit 40, clamp 147 on powder bag 110 can be removed and valve 224 (FIG. 3) opened, thereby allowing powder 146 within powder bag 110 to flow through transfer member 190A and into passage 42 of conduit 40. As previously discussed, powder bag 110 (or other powder bags disclosed herein) can be pressured to assist with powder flow and can be equipped with airlock chambers to help facilitate powder flow. Powder 146 and liquid 28 combine and mix to form a liquid mixture as they travel along conduit 40 toward second end 46 of conduit 40. The mixing is enhanced as the liquid mixture passes through diffuser 64 and into hydration container 18. Furthermore, the liquid mixture is further mixed by mixing system 29/mixing element 30 within hydration container 18 as the liquid mixture flows from second end 46 of conduit 40 back to first end 44. Although not required, positioning first end 44 and second end 46 of conduit 40 on opposite sides and opposite end of hydration container 18 can help to optimize retention time and mixing within hydration container 18. The liquid mixture eventually reenters first end 44 of conduit 40 where it is again pumped by pump 80 through conduit 40 where it can be combined with additional powder 146 as is flows past transfer member 190A.

Once powder 146 is fully removed from powder bag 110, valve 224 can be moved to the closed position, clamp 147 (FIG. 3) reapplied to powder bag 110, and powder bag 110 separated from transfer member 190A. A liquid, such as the same liquid as liquid 28, can be dispensed into powder bag 110 through port 150 (FIG. 3) so as to wash away any remnant powder 146 located on the interior surface of powder bag 110. As previously discussed, however, it is typically not desirable to wet the interior of transfer member 190A through which additional powder 146 may pass. As such, a drain line can be coupled to power bag 110. The liquid and remnant powder can then be drained from powder bag 110 and then separately fed into conduit 40 or hydration container 18. If needed, a new powder bag 110 can then be coupled to transfer member 190A and the above process repeated to dispense powder 146 of the new powder bag 110 into conduit 40. As discussed below in more detail, in exemplary embodiments, it is appreciated that it may be necessary to sequentially couple multiple powder bags 110 to transfer member 190A and dispense powder 146 thereof into liquid 28. Specifically, in exemplary embodiments of the present disclosure, powder bags 110 are sized so that when powder bags 110 are filled with powder 146 they can each be manually lifted and secured to transfer member 190A without the need for a mechanic lift or other equipment. As such, filled powder bags 110 typically have a weight in a range between 10 kg and 30 kg and more commonly between 15 kg and 25 kg. In other embodiments, each filled powder bag 110 can have a weight of at least or less than 10 kg, 15 kg, 20 kg, 25 kg, 30 kg or in a range between any of the foregoing. Using powder bags 110 of lower weight that can be manually lifted, eliminates the need for mechanical lifts, improves operation safety, and makes the system more versatile. However, because the filled powder bags 110 have a relatively low weight (low volume) for manual movement, in some applications it may be necessary to use a plurality of powder bags 110 to achieve desired concentrations of powder 146 within liquid 28. In other applications, larger volume powder bags 110 having an increased weight can be used so as to limit the number of powder bags 110 that need to be used.

Pump 80 and mixing system 29 continue to operate to flow powder 146 into and through conduit 40 until a desired concentration of powder 146 is dispensed into liquid 28 and the liquid mixture is sufficiently and homogeneously mixed. The properties of the liquid mixture can be based on time of mixing and/or properties determined by sensor 26.

As previously discussed, in one embedment of the present disclosure, powder hydration system 10 can further comprise reactor tank assembly 16 which is fluid coupled to conduit 40 by a tubular fill line 300. The reactor tank assembly 16 can comprise a bioreactor or fermenter for growing cells or microorganisms. For example, reactor tank assembly 16 can comprise a rigid support housing 302 that houses and supports a reactor container 304. Reactor container 304 can comprise a collapsible bag made of one or more sheets of a flexible, water impermeable polymeric film such as a low-density polyethylene. Reactor container 304 can be made of the same materials and have the same sizes, properties and alternatives as previously discussed with regard to hydration container 18. A fluid mixing system 306 is coupled with reactor container 304 and includes a mixing element 308 disposed within reactor container 304. Fluid mixing system 306 can comprise the same mixing systems and alternatives as previously discussed with regard to mixing system 29. Once the liquid mixture is completed within hydration container 18, a valve 310 associated with fill line 300 and/or conduit 40 can be opened so that the liquid mixture is now pumped by pump 80 through fill line 300 and into reactor container 304. A sterilizing filter 312 is typically disposed along fill line 300 so as to sterilize the liquid mixture as it passes between hydration container 18 and reactor container 304. Depending on the application, sterilizing filter 312 may not be required. Where the liquid mixture forms a liquid media for growing cells or microorganism, the liquid mixture within reactor container can then receive an inoculation of cells or microorganism which can then be grown within reactor container 304.

Once the liquid mixture is removed from hydration container 18, the process can then be repeated by again filling hydration container 19 with liquid 28. Alternatively, the disposable components of powder hydration system 10 can be removed, (e.g., conduit 40, hydration container 18, and the disposable portion of pump 80) and replaced with corresponding new components. The process can then be repeated for a new batch.

Figure 10:
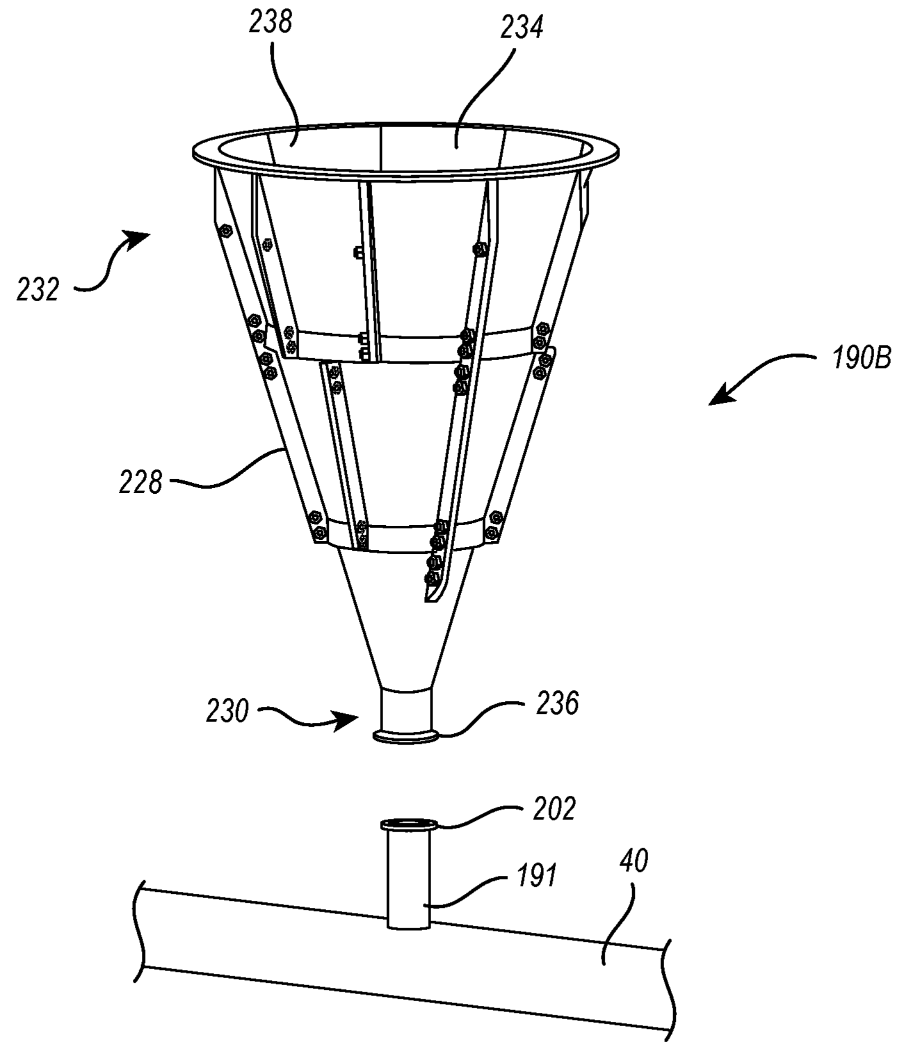
FIG. 10 is a perspective view of an exemplary transfer member comprising a hopper.

It is appreciated that the above described system and related methods can have a variety of alternatives and modifications. For example, depicted in FIG. 10 is an alternative embodiment of transfer member 190A. In this embodiment, a transfer member 190B is depicted in the form of a tapered hopper having a circular transverse cross section. More specifically, transfer member 190B includes a tapered hopper 228 having a first end 230 and an opposing second end 232 with an outwardly flaring passage 234 that extends therebetween. In one embodiment, first end 230 is disposed directly on conduit 40 so that passage 234 communicates with passage 42 of conduit 40. For example, first end 230 could be integrally formed with conduit 40 or connected by threaded connection or other connection techniques. In an alternative embodiment, transfer member 190B can further comprise stem 191 mounted on conduit 40, as previously discussed, with flange 202 disposed on stem 191. An annular flange 236 can be formed at first end 230 of hopper 228 so that first end 230 of hopper 228 and stem 191 can be coupled together using a clamp, such as clamp 204 or by using any one of the other techniques previously discussed with regard to connecting powder bag 110 to transfer member 190A.

Second end 232 of hopper 228 bounds an opening 238 that communicates with passage 343. Powder bag 110 can be coupled with transfer member 190B using a variety of different techniques so that powder 146 can be fed into passage 234 through opening 238. It is appreciated that in one embodiment, powder bag 110 could simply be opened and powder 146 therein poured into hopper 228 through opening 238. However, powders 146 commonly used in the present disclosure are fine powders that will easily float in the air and disperse throughout a room if openly poured from powder bag 110. The problem with this is that dispersed powders can be messy, difficult to clean up, produce cross contamination with powders/liquids that may be processed later in the same facility and result in a loss of powder which is both expensive and, unless accounted for, can diminish concentrations in the liquid being prepared. As a result, the transfer of powders 146 from powder bag 110 to a corresponding transfer member is typically done through a sealed connection that will preclude or at least minimize any dispersion or loss of powder 146 at the connection. Once such connection is the connection between port 132 of power bag 110 and transfer member 190A, as previously discussed. One challenge, however, is that it can be difficult to have powders freely flow out of a flexible power bag and into a transfer member while maintaining a sealed connection without clogging of the powders. Some embodiments of the present disclosure provide unique solutions to both maintaining a sealed connection with powder bags while achieving a free flow of the powder. One example of helping to achieve the foregoing is the use of the airlocks as previously discussed.

Figure 11:
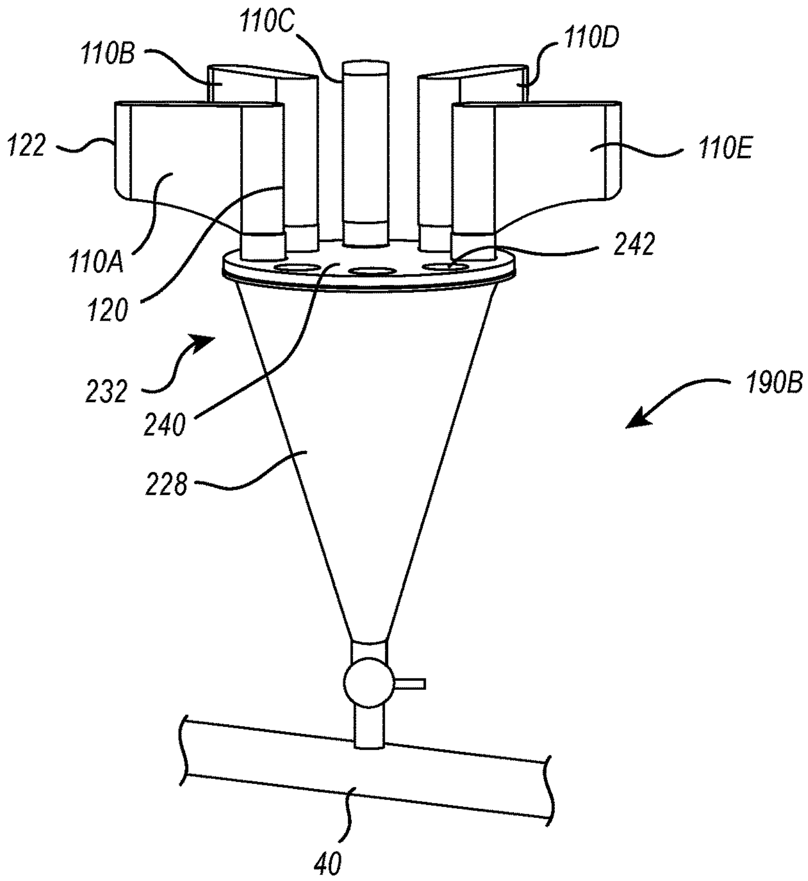
FIG. 11 is a perspective view of the transfer member shown in FIG. 10 that further comprises a lid having multiple powder bags mounted thereon.

With regard to forming sealed connections between powder bag 110 and hopper 228, as depicted in FIG. 11, transfer member 190B can further comprises lid 240 secured to second end 232 of hopper 228 so as to cover and typically seal opening 238. Lid 240 has a plurality of port opening 242 extending therethrough that communicate with passage 234. Each port opening 242 is configured to couple with a corresponding powder bag 110 in a sealed connection. In one embodiment, lid 240 can be formed with at least 2, 3, 4, 6, 8, 10, or 12 port openings 242 or have a number in a range between any two of the foregoing. Thus, in one embodiment, at least 2, 3, 4, 6, 8, 10, or 12 powder bags 110 or a number in a range between any two of the foregoing can be connected to transfer member 190B.

In one embodiment, lid 240 is circular and port openings 242 are radially spaced apart at locations toward a perimeter of lid 240. Powder bags 110 can be coupled to port openings 242 using a variety of different techniques. In one embodiment, each port opening 242 can comprise stem 191 and flange 202 (FIG. 3) as previously discussed with regard to transfer member 190A. Thus, powder bags 110 can be removably coupled to port openings 242 in a sealed connection using clamps 204. In alternative embodiments, powder bags 110 can be coupled to port openings 242 using any one of the other techniques previously discussed with regard to connecting powder bag 110 to transfer member 190A.

With continued reference to FIG. 11, powder bags 110A-110E are mounted on transfer member 190B/lid 240. In one embodiment, first side 120 of each powder bag 110 faces toward the center of lid 240 while second side 122 faces radially outward away from the center of lid 240. As previously discussed, the asymmetrical configuration of powder bags 110 enables a large number of powder bags 110 to be simultaneously mounted on a relatively small lid 240. As previously discussed, in one embodiment of the present disclosure, powder bags 110 are sized so that when powder bags 110 are filled with powder 146 they can each be manually lifted and secured to a transfer member without the need for a mechanic lift or other equipment. However, because the filled powder bags have a relatively low weight for manual movement, in some applications it may be necessary to use a plurality of powder bags 110 to achieve desired concentrations of powder 146 within liquid 28 of hydration container 18 (FIG. 1). In one embodiment, as previously discussed with regard to transfer member 190A, multiple powder bags 110 can be sequentially connected to conduit 40 as each powder bag 110 is emptied. However, using transfer member 190B where multiple powder bags 110 can initially be simultaneously mounted thereon, eliminates or minimizes the need for continuous monitoring and manipulation of the powder bags 110 during processing of the powder.

In one embodiment of use, all of powder bags 110 coupled to transfer member 190B/lid 240 can be opened so that they are all simultaneously feeding powder into hopper 228. In another embodiments, powder bags 110 coupled to transfer member 190B/lid 240 could be sequentially opened by sequentially removing clamps 147 from powder bags 110.

Figure 12:
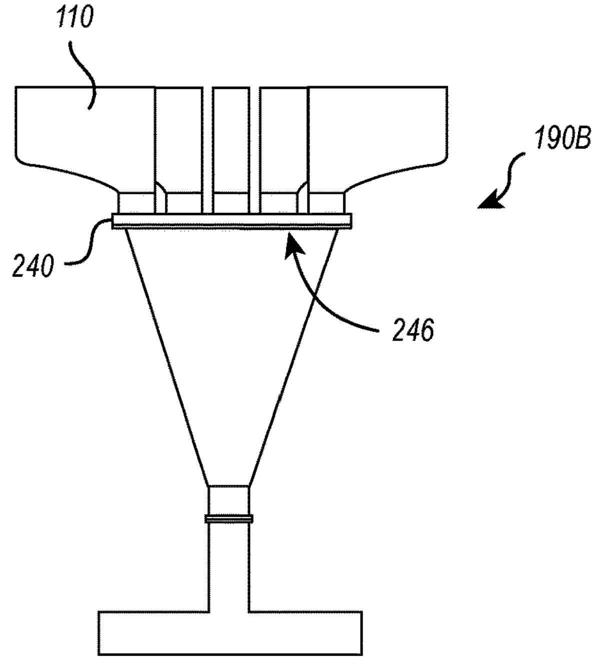
FIG. 12 is an elevated side view of the transfer member shown in FIG. 11 further comprising a pie valve incorporated into the lid.
Figure 13:
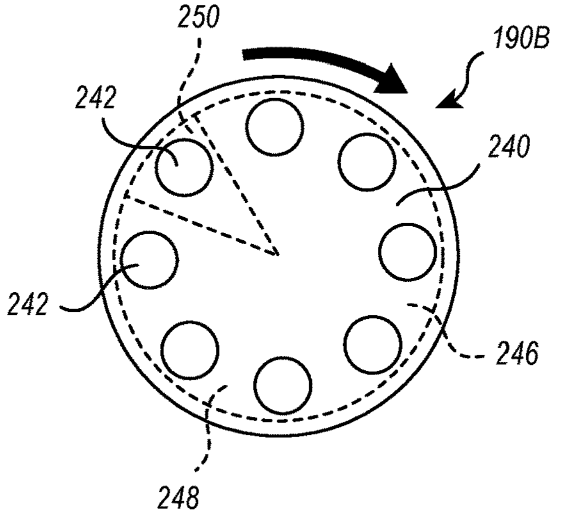
FIG. 13 is a top plan view of the lid shown in FIG. 12 revealing the hidden pie valve.

In another alternative embodiment, transfer member 190B can be automated to sequentially release the powder 146 from the powder bags 110 into transfer member 190B. Specifically, as depicted in FIGS. 12 and 13, transfer member 190B can further comprise a pie valve 246 rotatably disposed below lid 240. Pie valve 246 comprises a plate 248, that is typically circular, and that has a valve opening 250 extending therethrough. Valve opening 250 is sized and positioned so that as plate 248 is rotated, valve opening 250 sequentially aligns with a corresponding one of port openings 242 while the reminder of port openings 242 remain blocked by plate 248. As such, powder 146 can only flow out of the powder bag 110 that is aligned with valve opening 250. In one embedment, valve opening 250 can be wedge shaped, pie shape, circular, polygonal, oval, or any other shape that will allow powder 146 to flow therethrough. Valve opening 250 is typically the same size or larger than port openings 242 to as not to constrict the flow of powder 146. The rotation of pie valve 246 can be manually controlled or can be automatically regulated by a controller. For example, a drive motor can be used to facilitate rotation of plate 248. A controller can be coupled with the drive motor. The controller can facilitate operation of the drive motor based on time or sensor readings from the powder bag, such as weight, fill level, powder movement or the like.

Other benefits can also exist by having multiple powder bags 110 simultaneously coupled to transfer member 190B. For example, as previously discussed, once powder 146 is removed from a powder bag 110, it can be desirable to wash out remnant powder left on the interior surface of power bag 110. However, it is undesirable to wet the interior of transfer member 190B if additional powder 146 will flow therethrough. Accordingly, in one method of use, all of the powder bags 110 needed to combine with liquid 28 are simultaneously coupled to transfer member 190B. The powder bags 110 are then emptied either concurrently or sequentially. Once all of the powder bags 110 are emptied, rinse water can then be applied to each powder bag 110 through ports 150 to remove the residual power. In this situation, the rinse water can be left to freely flow down transfer member 190B and into conduit 40 because no additional dry powder will be needed.

Figure 14:
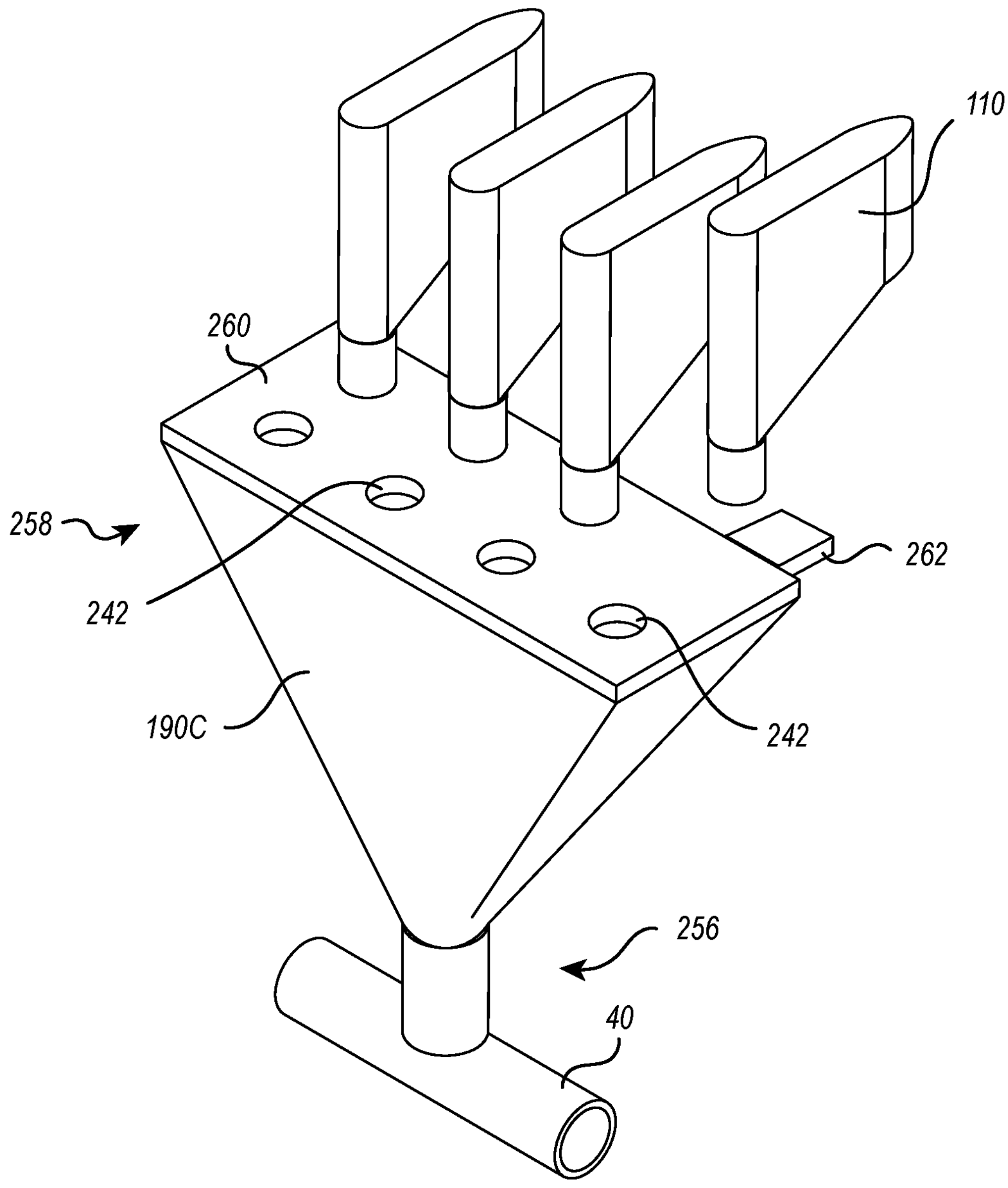
FIG. 14 is an exemplary transfer member having a hopper with a rectangular transverse cross section.

Turning to FIG. 14, a transfer member 190C is used to transfer powder 146 from powder bags to conduit 40. In contrast the circular hopper used in transfer member 190B, transfer member 190C includes a tapered hopper 254 having a first end fluid coupled to conduit 40 and an opposing second end 258 with a tapered passage at least partially extending therebetween. At least a portion of hopper 254 can have a rectangular transverse cross section. Disposed on second end 258 of hopper 254 is a lid 260 that can also have a rectangular configuration. Extending through lid 260 are a plurality of port openings 242, as previously discussed with regard to FIG. 11. Each port opening 242 can selectively couple with a corresponding powder bag 110. Powder bag 110 can operate with transfer member 190C in the same alternative ways as discussed above with regard to transfer member 190B. However, in contrast to using rotating pie valve 246, a separate valve 262 can be used to control opening and closing each of port openings 242. In one embodiment, each valve 262 can comprise a guillotine valve, shutter valve or other valve that will function for its intended purpose.

With reference to FIG. 1, as previously discussed, powder bag 110 coupled with transfer member 190 (transfer member "190" refers to all transfer members disclosed herein) is disposed at a lower elevation than the upper end of hydration container 18. Furthermore, powder bag 110 is typically disposed at a lower elevation than top surface 62 of liquid 28 within hydration container 18. In addition, second end 46 of conduit 40 typically extends to a higher elevation than powder bag 110, such as where second end 46 connects to hydration container 18. As a result of the foregoing, should pump 80 intentionally or unintentionally discontinue operation, a portion of liquid 28 downstream of transfer member 190 within conduit 40 could backflow up into transfer member 190 and contact powder 146 within transfer member 190 and/or powder bag 110. The contacting of backflow liquid 28 with powder 146 within transfer member 190 and/or powder bag 110 can make the contacted powder 146 sticky and thereby clog or otherwise obstruct proper operation of transfer member 190 and/or powder bag 110. In turn, this can result in downtime of the system as the clogging is cleared and potential loss of some powder 146. To help prevent the foregoing, in one embodiment, a backflow valve can be used to prevent or limit the backflow of liquid 28 into transfer member 190 and/or powder bag 110.

Specifically, depicted in FIGS. 15-18 are alternative embodiments of backflow valves that can be used with the present disclosure. Although the figures depict the use of transfer member 190B in the embodiments, they can likewise be used with any of the transfer members disclosed herein. Depicted in FIGS. 15A and 15B is a backflow valve 320A disposed on conduit 40. In this embodiment, backflow valve 320A comprises a first pinch valve 322A coupled to or disposed in-line with conduit 40 downstream of transfer member 190B. In FIG. 15A, first pinch valve 322A is in an open position which allows liquid 28 to freely pass therethrough. In FIG. 15B, first pinch valve 322A has been moved to a closed position which prevents the backflow of liquid 28 into transfer member 190B. Pinch valve 322A can be controlled by a controller 324 which is in electrical communication with pump 80 and first pinch valve 322A. Thus, when controller 324 receives a signal from a sensor indicating a pressure change associated with pump 80 when it is no longer operating or is operating in a predefined condition, controller 324 can automatically move pinch valve 322A to the closed position. Such pressure sensing could be measured within conduit 40 and typically around pump 80 or transfer member 190B. In one embodiment, conduit 40 can be comprised of flexible tubing at the desired location and pinch valve 322A can be positioned over the flexible tubing. When pinch valve 322A is moved to the closed position, pinch valve 322A pinches closed the flexible tubing so as to preclude fluid flow therethrough. In turn, when pinch valve 322A is moved to the open position, the flexible tubing can resiliently rebounds to the original configuration.

Figure 15A:
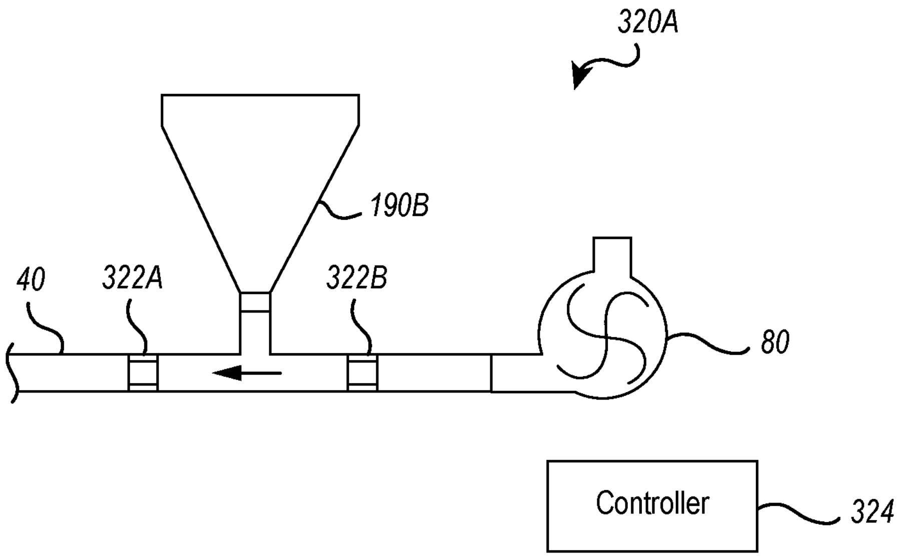
FIGS. 15A and 15B are exemplary backflow valves that can be used in association with a conduit.
Figure 15B:
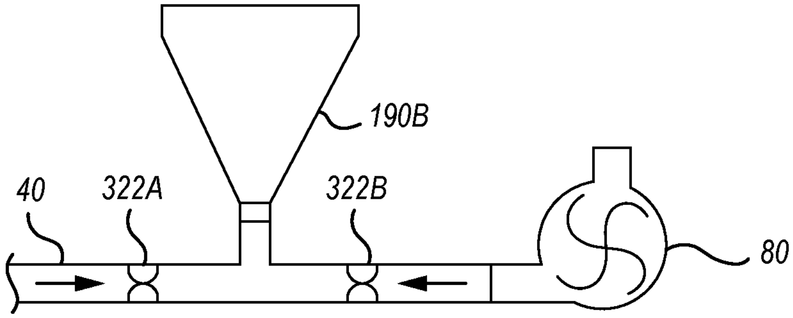

In one alternative embodiment, backflow valve 322A can also comprise a second pinch valve 322B disposed in-line with conduit 40 at a location between transfer member 190B and pump 80. In FIG. 15A, second pinch valve 322B is in an open position which allows liquid 28 to freely pass therethrough. In FIG. 15B, second pinch valve 322A is moved to a closed position which blocks or limits liquid 28 upstream of transfer member 190B from flowing into transfer member 190B. Second pinch valve 322B can be controlled by controller 324 in the same way as first pinch valve 322A. Second pinch valve 322B can likewise operate with a flexible section of conduit 40 as discussed above with pinch valve 322A.

Figure 16A:
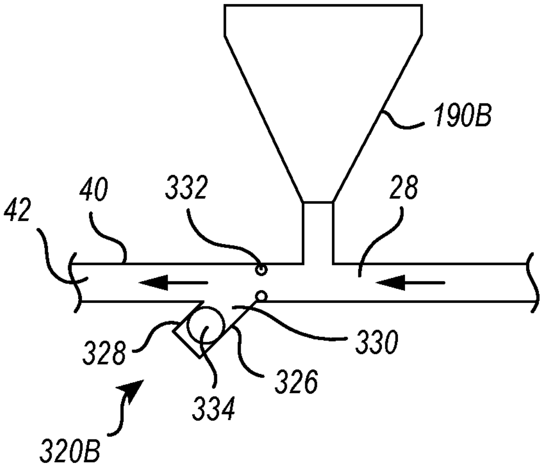
FIGS. 16A and 16B are exemplary backflow valves that can be used in association with a conduit.
Figure 16B:
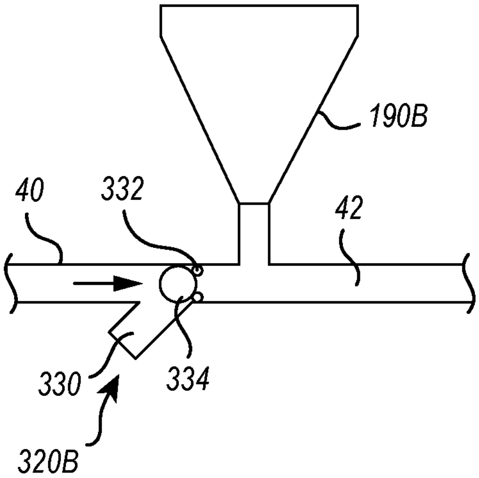

Depicted in FIGS. 16A and 16B is an alternative embodiment of a backflow valve 320B. Backflow valve 230B comprises a floating ball valve 326 formed on conduit 40. As depicted in FIG. 16A, floating ball valve 326 includes an extension 328 that downwardly projects from conduit 40 downstream of transfer member 190B. Extension 328 bounds a pocket 330 that is angled away from conduit 40 and is sloped away from transfer member 190. An annular seal 332 is formed on the interior surface of conduit 40 adjacent to the mouth of pocket 330 and encircles passage 42 of conduit 40. In FIG. 16A, a floating ball 334 is held within pocket 330 by the flow of liquid 28 within passage 42 of conduit 40. When pump 80 discontinues to operate, floating ball 334 will naturally raise and seal against annular seal 332, thereby preventing the backflow of liquid from flowing into transfer member 190B.

Figure 17A:
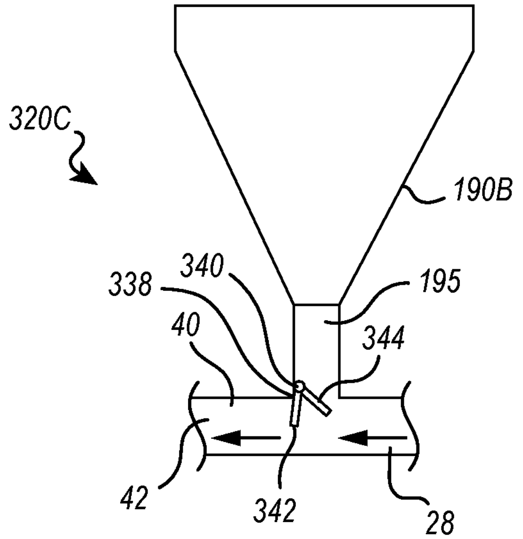
FIGS. 17A and 17B are exemplary backflow valves that can be used in association with a conduit.
Figure 17B:
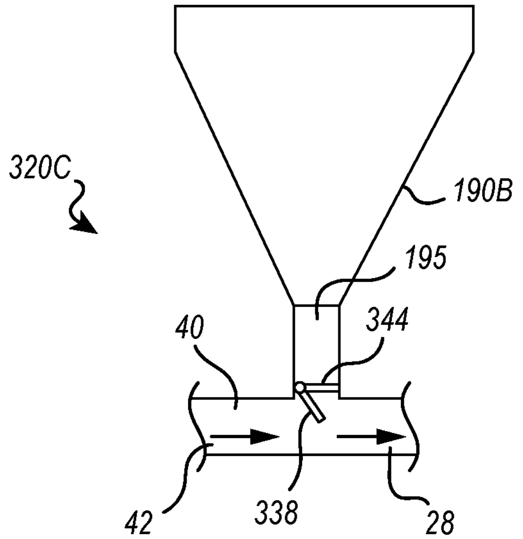

Depicted in FIGS. 17A and 17B is a backflow valve 320C operable with conduit 40. In this embodiment, backflow valve 320C comprises a check valve 338. Check valve 338 comprises a base 340 hingedly mounted inside of transfer member 190B adjacent to conduit 40. An arm 342 projects from base 340 into passage 42 of conduit 40. An annular seal 344 also projects from base 340. As depicted in FIG. 17A, during normal operation, liquid 28 flowing through passage 42 of conduit 40 retains arm 342 rotated forward so that seal 344 does not block passage 195 of transfer member 190B. However, as depicted in FIG. 17B, when pump 80 discontinues to operate, liquid 28 backflowing within passage 42 of conduit 40 forces arm 342 to rotate in the opposite direction which forces seal 344 into passage 195 so as to seal passage 195 closed, thereby preventing further backflow of liquid 28 up into transfer member 190B.

Figure 18A:
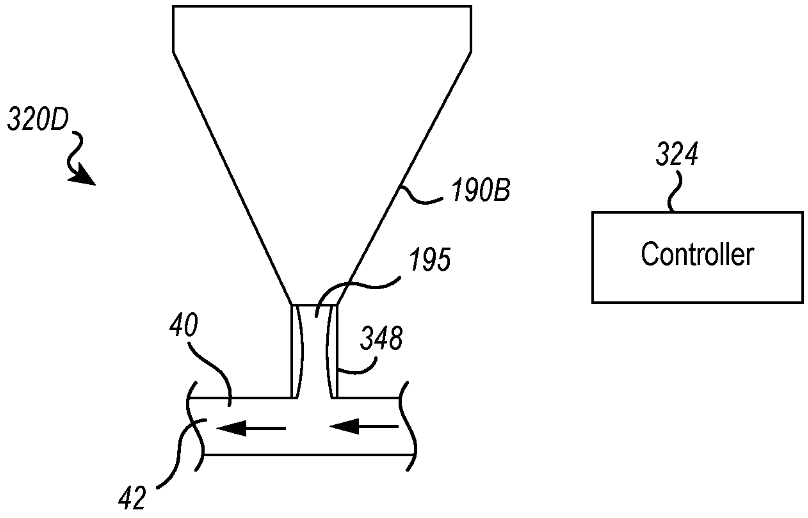
FIGS. 18A and 18B are exemplary backflow valves that can be used in association with a conduit.
Figure 18B:
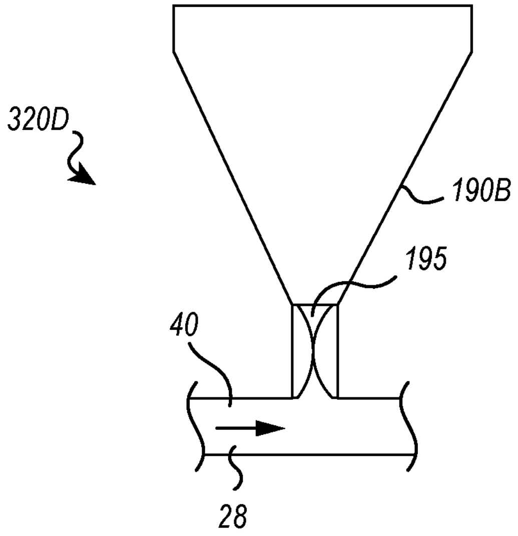

Depicted in FIGS. 18A and 18B is a backflow valve 320D. Backflow valve 320D comprises a pinch valve 348 disposed on or in-line with passage 195 of transfer member 190B. Pinch valve 348 is disposed adjacent to conduit 40. In FIG. 18A, pinch valve 348 is open allowing powder 146 to travel down through transfer member 190B and into passage 42 of conduit 40. When controller 324 determines through a sensor that pump 80 is no longer operating or operating at a predefined condition, controller 324 moves pinch valve 348 into a closed position, as depicted in FIG. 18B, so as to block the flow of liquid 28 into passage 195 of transfer member 190B. The sensor could measure properties such as fluid pressure, fluid flow rate, turbidity, or other variables to determine operation of pump 80. In this embodiment, at least a portion of transfer member 190B can be formed from a piece of flexible tubing. Pinch valve 348 can pinch the flexible tubing closed when in the closed position and allow the flexible tubing to rebound when in the open position. Other backflow valves can also be used.

In exemplary embodiments of the present disclosure, the exemplary powder hydration systems disclosed herein include an eductor coupled to transfer member 190 and disposed in-line with conduit 40 so that the liquid pumped through conduit 40 by pump 80 also passes through the eductor. In turn, the eductor assists in sucking or drawing powder 146 into liquid 28 passing through the eductor. By way of example, returning to FIG. 8, a tubular eductor 268A is disposed in-line between two sections of conduit 40. Eductor 268A has an inlet end 270 fluid coupled with a section 40A of conduit 40 and an opposing outlet end 272 coupled with a section 40B of conduit 40. Eductor 268A has an encircling sidewall 273 with interior surface 274 that bounds a channel 276 extending between opposing ends 270 and 272. Channel 276 of eductor 268A is in fluid communication with passage 42 of conduit 40. A side opening 278 passes through sidewall 273 of eductor 268A. In this embodiment, transfer member 190A is directly coupled to eductor 268A at side opening 278 so that passage 195 of transfer member 190A is in fluid communication with channel 276. The other transfer members 190 previously disclosed as being coupled to conduit 40 can likewise be coupled to eductor 268A.

Channel of 276 of eductor 268A includes an inlet portion 280 disposed at inlet end 270 and having a first cross sectional area A1; a receiving portion 282 disposed at or toward outlet end 272 and having a second cross sectional area A2; and a constricting portion 284 disposed between inlet portion 280 and receiving portion 282 and having a third cross sectional area A3 that is smaller than first cross sectional area A1 and second cross sectional area A2. As a result, constricting portion 284 forms a venturi eductor wherein the fluid pressure at constricting portion 284 is lower than the fluid pressure at inlet portion 280 and receiving portion 282. More specifically, in one embodiment eductor 268A is configured so that when pump 80 is pumping liquid 28 through eductor 268A, the pressure at constricting portion 284 is lower than atmospheric pressure. Side opening 278 is aligned with and communicates with constricting portion 284 or receiving portion 282 so that a sucking force produced by the lower pressure at constricting portion 284 sucks or assists in drawing powder 146 from powder bag 110 and into channel 276 of eductor 268A so as to mix with liquid 28 flowing therethrough. Accordingly, powder 146 is directed to eductor 268A both by the gravitational force applied to powder 146 and the sucking force applied to powder 146.

In view of the foregoing, eductor 268A has the unique benefits of providing a sucking force which assists in providing a free flow of powder 146 from powder bag 110, through the transfer member 190A and into eductor while still enabling powder bag 110 to be coupled to transfer member 190A in a sealed connection. It is appreciated, however, that because of the sucking force produced by eductor 268A, powder bag 110 can potentially collapse upon itself and block the flow of some powder 146 after a portion of the powder 146 has been removed. To help eliminate this problem, a gas line can be coupled to port 150 and used to maintain a positive pressure, such as those previously discussed, within compartment 114. For example, a pressure sensor can monitor the pressure within compartment 114 and a controller communicating with the sensor can adjust the gas flow rates based on the pressure readings so as to help ensure that the positive pressure is maintained independent of the suction applied to by eductor 268A.

In the depicted embodiment shown in FIG. 1, pump 80 is positioned upstream of eductor 268A. Because eductor 268A can draw gas into liquid 28 flowing through eductor 268A and conduit 40, positioning pump 80 upstream of eductor 268A minimizes the risk that gas can collect in pump 80 and cause irregular operation. In other exemplary embodiments, however, pump 80 can be positioned downstream of eductor 268A. This positioning can have the benefit of enhancing mixing of powder 146 and liquid 28 which now jointly pass through pump 80.

As previously discussed, the powder flow rate and gas pressure on the powder can, in part, be regulated by the airlock and applied gas pressure. It can also be helpful in optimizing production to regulate the flow of liquid 28 feeding into pump 80 from hydration container 18 (i.e., the recirculation vessel). In one embodiment, a low cost piece of large bore tubing upstream of the venturi could serve as the valve (e.g., inline pinch clamp, screw rod clamp, or eccentric roller clamp). The main objective is to regulate the mass flow and manipulate the differential pressure as part of the induction strategy. Holistically, exemplary systems herein disclosed are capable of managing and optimizing the following parameters:

Prevent cavitation or air locking of the pump 80 (less desirable operating conditions may reduce efficiency or possibly damage the pump).

Optimize robust volumetric addition of powders (kg/hour) with ideal total charge times of <30 min desired and <60 min required for up to 150 kg.

Prevent backflow of liquid into the dry powder deliver side from the liquid supply reservoir (automation becomes very helpful on a universal powder delivery system should be adaptable to a wide range of vessel geometries and hydrostatic conditions (i.e., 1000 L @<1 m or 5000 L @>4 m or partial full conditions of 200 L @<0.2 m).

Regulate an auxiliary WIFI injection port, to wet or supplement the pump early in the process and thus allow the powder induction process to start earlier. Priming the pump in this way can maximize the powder feed rate and allow the powder addition steps to start sooner in a typical work-flow process. This also helps better utilize what is often wasted time, by compensating for low head conditions that often exist when the vessel is at 10-80% of working volume. The additional port can use a jet or vortex geometry, which increases flow momentum and induces higher induction rates. If the powder addition process can start sooner, there are several benefits. Below are two examples of how to manage and/or optimize use of the exemplary powder hydration systems herein disclosed:

Reduce maximum feed rate required per time window (larger prep window for less intensity or lower maxim powder feed rate required to reduce size or cost of powder addition devices or pump device).

Reduce total time of media/buffer prep (start sooner in the process window and maximize integral feed time within batch window).

Figure 19:
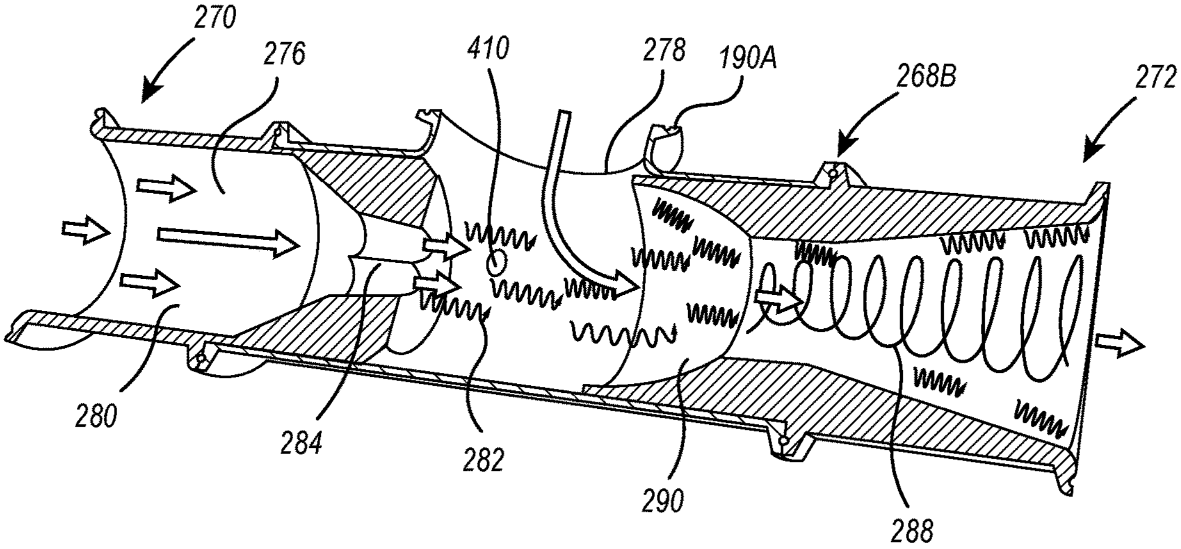
FIG. 19 is a perspective cross sectional view of an exemplary eductor that can be used in the systems herein disclosed, including the system shown in FIG. 8.

It is appreciated that eductor 268A can have a variety of different configurations. For example, depicted in FIG. 19 is an exemplary embodiment of an eductor 268B wherein like elements between eductor 268A and 268B are identified by like reference numbers. In this embodiment, constriction portion 284 of channel of 276 has a frustoconical configuration and side opening 278 and transfer member 190A are directly aligned with receiving portion 282 adjacent to the outlet of constricting portion 284. Channel 276 of eductor 268B further includes a frustoconical mixer portion 288 that outwardly flares as it extends to outlet end 272 and a secondary constricting portion 290 that frustoconically constricts as it extends between receiving portion 282 and mixing portion 288. The configuration and position of secondary constricting portion 290 and mixer portion 288 down stream of receiving portion 282 assists in increasing the turbulent flow of liquid 28 which further assists in mixing powder 146 with liquid 28.

FIG. 19 also illustrates one embodiment of a powder bag wash down port. In some embodiments, the port may provide for robust feeding in the venturi or eductor. As previously discussed, in some embodiments it may be desirable to rinse powder bags of residual powder. However, it can be helpful to not wet the same flow path the powder uses for induction. Adding a small connection port 410 between the suction and venturi area, a drain line can be positioned between the power bag 110 and port 410. Port 410 will allow the powder bag to drained by vacuum and bypass the powder feed path. Before disconnecting the powder feed path, a user could connect the rinse line, add water, manipulate the bag, connect the drain line and open the clamp.

Figure 20:
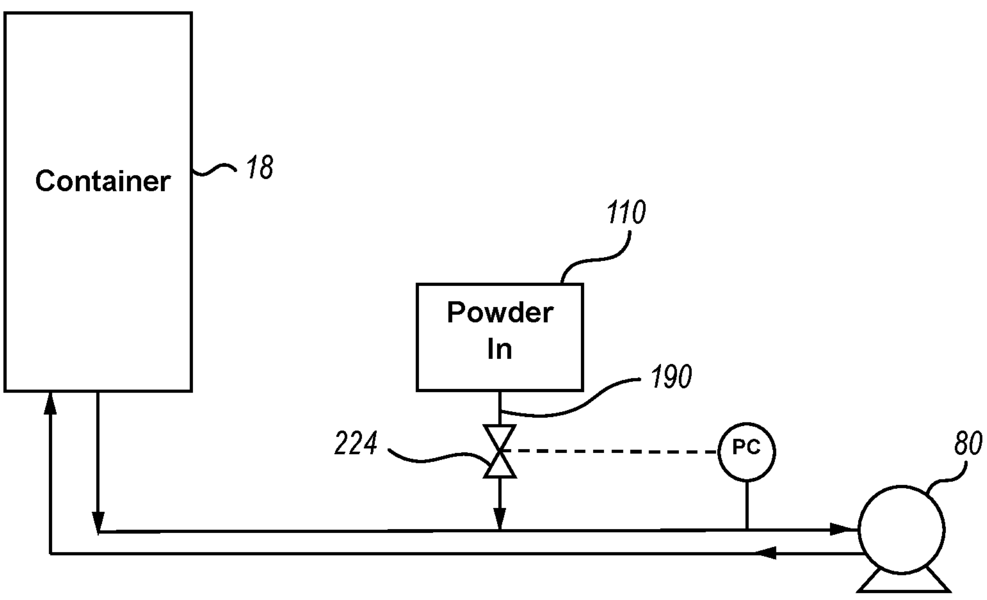
FIG. 20 is a schematic of one an exemplary hydration system that includes a single pump and automated pressure/feed control systems.

FIG. 20 is a schematic showing of one alternative embodiment of the hydration system that includes a single pump 80 and automated pressure/feed control systems. When using a standard magnetically driven centrifugal pump, entrained air can cause a reduction in pump performance. Pump performance reduction equals increase in suction side pressure and decrease in discharge side pressure. Pump performance will drop rapidly before becoming air locked. This can be problematic if liquid 28 rises into powder bag 110 which as previously discussed can result in powder 146 becoming sticky and clogging powder bag 110 and/or transfer member 190, thereby requiring manual intervention. Manual or automated closing of powder valve 224 can also prevent this. Performance drop measured by pressure change can trigger powder control valve 224 to close via automation. This will immediately cease the introduction of atmospheric air into the system, protect powder 146 from wetting, allow entrained air to work its way to system high point (i.e., hydration container 18). It is noted that in the alternative embodiment in FIG. 20, pump 80 is disposed downstream of transfer member 190.

Figure 21A:
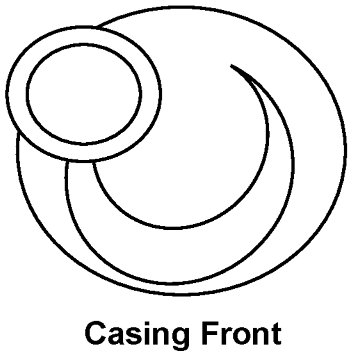
FIGS. 21A-21C are elevated side views of exemplary single-use, liquid ring pumps that can be used together with systems herein disclosed.
Figure 21B:
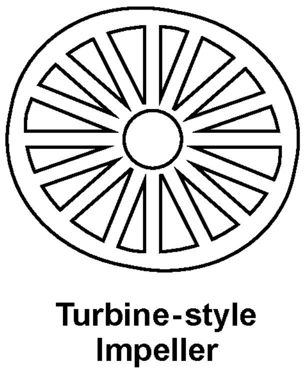
Figure 21C:
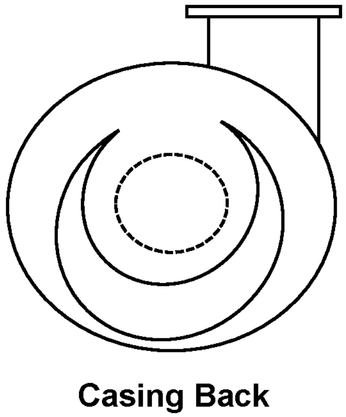

FIGS. 21A-21C illustrate exemplary embodiments of a single-use, liquid ring pumps that can be used as pump 80 (FIG. 1). An exemplary single-use embodiment includes a 3-piece assembly with casings screwed and clamped together. A magnet integrated into a turbine style impeller (with or without shaft), fits into a back casing. The geometry of casing expands and contracts to create pressure gradient. These exemplary pumps can be used instead of other sterile pumps for self-priming continuous flow and maintained flow with powder uptake. One key advantage of these exemplary pumps is they self-prime as pressure gradient is driven by pushing water in a cell through a variable volume channel in the pump casing. Design parameters can include: cell number, cell size, cell wall thickness, overall compression ratio, casing symmetry (top and bottom), casing expansion, contraction rate, and magnetic drive with or without shaft.

Figure 22:
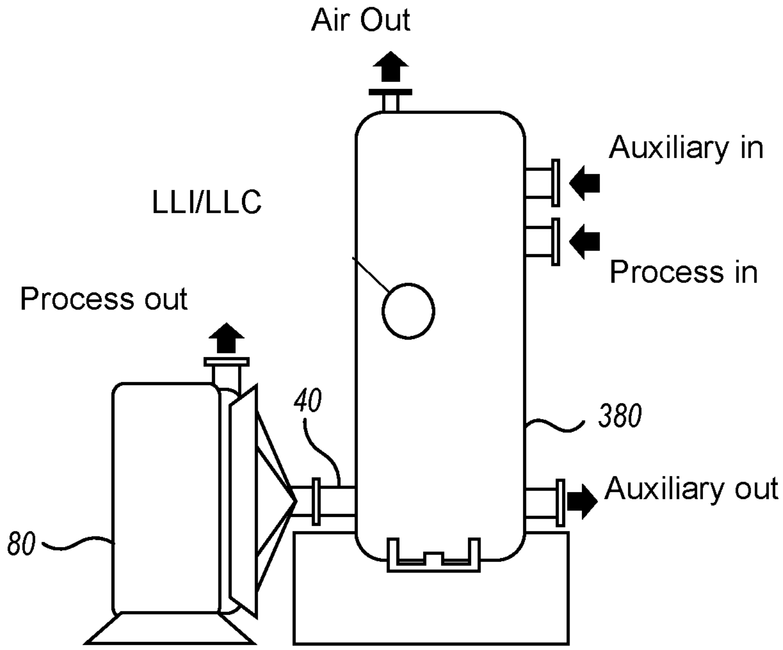
FIG. 22 is an elevated side view of an exemplary prime and blend chamber that can optionally be used together with systems herein disclosed.

FIG. 22 illustrates an exemplary embodiment of a prime and blend chamber 380 that can optionally be used in the inventive disclosure. Prime and blend chamber 380 can be positioned immediately upstream of pump 80 to reduce airlock problem in pump 80. Prime and blend chamber 380 functions as a flash vessel or bubble release point, allowing air entrained during induction of powder 146 into liquid 28 induction to escape before reaching pump 80. Prime and blend chamber 380 also doubles as a blending chamber, increasing in-line powder hydration. In some embodiments, prime and blend chamber 380 may require an auxiliary liquid line and a controller (e.g., a float valve) to maintain constant liquid level in prime and blend chamber 380.

Figure 23:
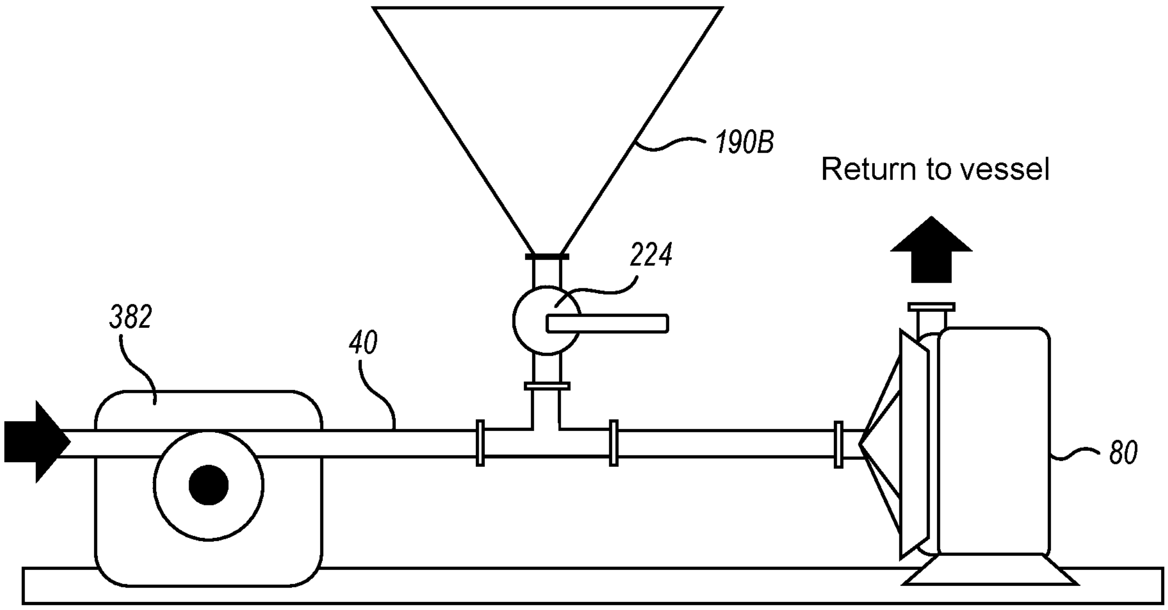
FIG. 23 is an elevated side view of an exemplary system that includes a peristaltic priming pump.

FIG. 23 illustrates an exemplary embodiment of a powder hydration system with a peristaltic priming pump 382. The peristaltic priming pump 382 (or other positive displacement pump (Quattroflow)) can be positioned and installed upstream of the powder-liquid mixing point and pump 80. As previously discussed, pump 80 may create a driving force for powder induction. Peristaltic priming pump 382 will prime pump 80, which can be a centrifugal pump, should it become air-locked and provide control of flow to prevent liquid ingress into transfer member 190B, e.g., hopper (like a valve). The peristaltic priming pump 382 can be automated and coupled to a controller that controls power to the pump based on system parameters. The peristaltic priming pump 382 can be fixed to an auxiliary line so that the pump turns on when pressure in the suction line rises.

Figure 24:
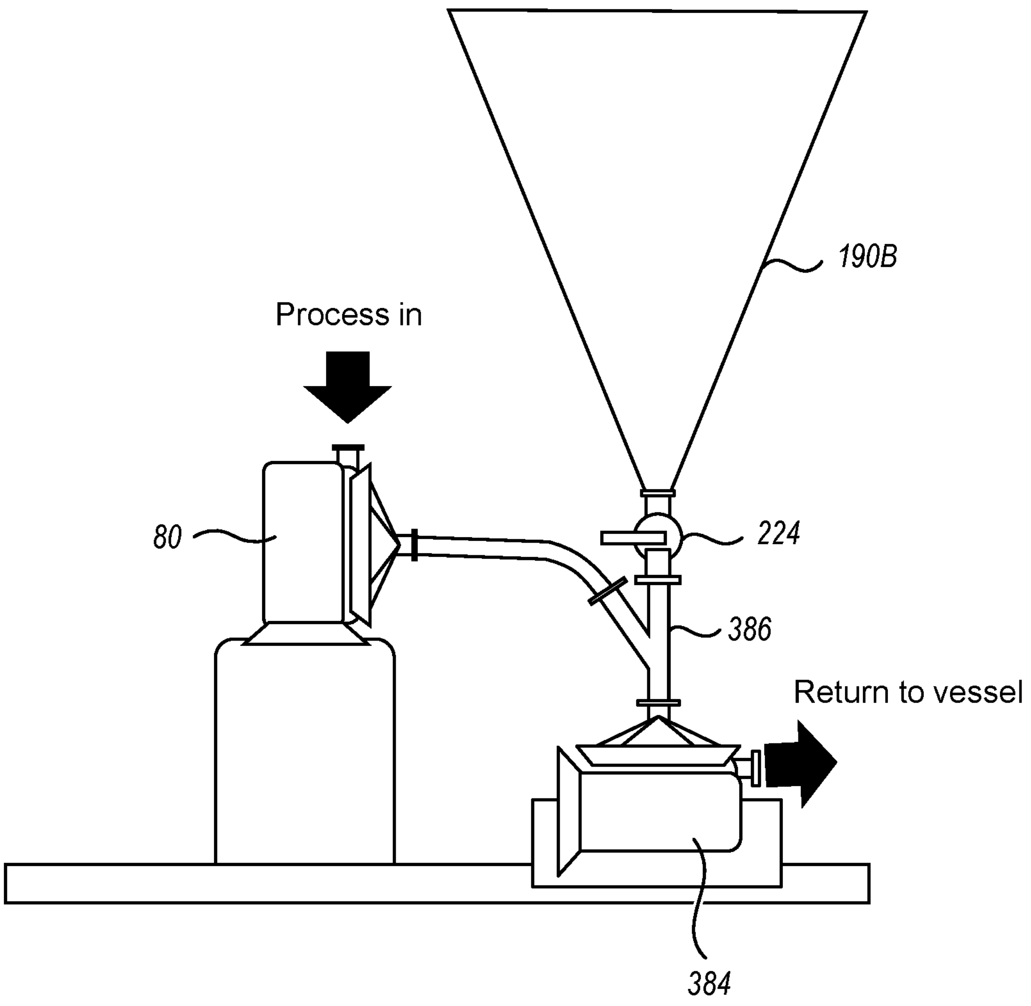
FIG. 24 is an elevated side view of an exemplary system that includes a single-use tri-blender.

FIG. 24 is an exemplary embodiment of use of a single-use tri-blender 384. The tri-blender 384 can include single-use components. Pump 80 is upstream of powder induction point (e.g., transfer member 190) and tri-blender 384. The tri-blender 384 can also include a delivery connection 386. For example, delivery connection 386 can produce a ring of fluid around powder 146 being dispensed through transfer member 190. The delivery connection 386 can be a T connection or other component to produce a ring of fluid around powder 146.

Figure 25:
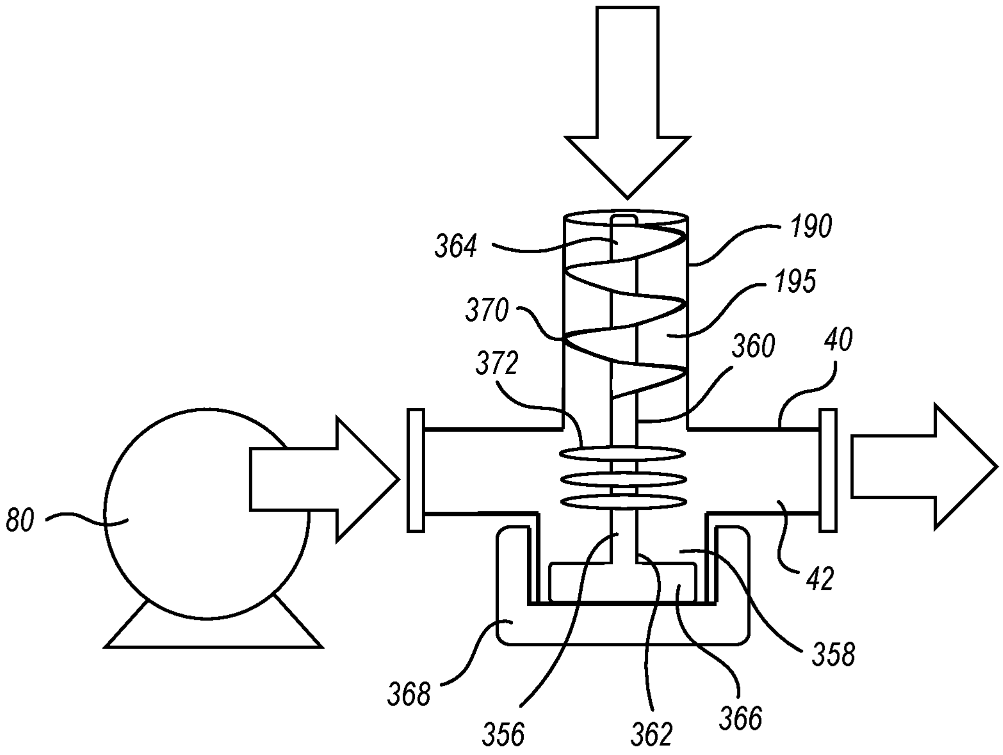
FIG. 25 is a partial cross-sectional side view of an exemplary auger assembly that can be used together with the conduits and systems herein disclosed.

In addition to or in place of using an eductor to draw in powder 146 from powder bag 110, an auger assembly can be used to draw powder 146 into conduit 40. By way of example, FIG. 25 depicts conduit 40 having transfer member 190 projecting therefrom and bounding passage 195. An auger assembly 356 is partially disposed within conduit 40. Specially, conduit 40 is formed having a pocket 358 that is recessed on the interior surface of conduit 40 in alignment with but on the opposite side of transfer member 190. Auger assembly 356 includes a drive shaft 360 that passes through passage 42 of conduit 40 with a first end 362 disposed at or toward pocket 358 and an opposing second end 364 projecting into or through passage 195 of transfer member 190. A base 366 is secured to first end 362 of drive shaft 360 and is rotatable disposed within pocket 358. A magnetic driver 368 is rotatably disposed outside of conduit 40 adjacent to pocket 358. Magnetic driver 368 is configured to produce a magnetic force on base 366 so that rotation of magnetic driver facilitates rotation of base 366 which in turn facilitates rotation of driver shaft 360 and any components mounted thereon. Outwardly projecting from second end 364 of drive shaft 360 at least partially within passage 195 of transfer member 190 is an auger blade 370. As such, rotation of drive shaft 360 by magnetic driver 368 facilitates rotation of auger blade 370 which in turn draws powder 146 down through transfer member 190 in a controlled and regulated manner and dispenses powder 146 into passage 42. The powder induction rate is thus controlled by the rotation rate of auger blade 370.

In exemplary embodiments, mixing blades 372 can also be formed on an outwardly project from drive shaft in alignment with passage 42, i.e., between auger blade 370 and base 366. Mixing blades 372 function to mix liquid 28 and powder 146 as powder 146 first enters passage 42.

In another alternative embodiment, auger assembly 356 can be used in conjunction with eductor 268. In this embodiment, auger assembly 356 is positioned and operated in the same manner with regard to the transfer member. However, in contrast to transfer member 190 being directly coupled to conduit 40, transfer member 190 is directly coupled to eductor 268A/268B and pocket 358 is formed into the eductor. In turn, auger assembly 356 rotates directly within the eductor. This embodiment achieves the dual benefits of drawings in the powder 146 both by sucking and rotation of the auger blades.

Figure 26:
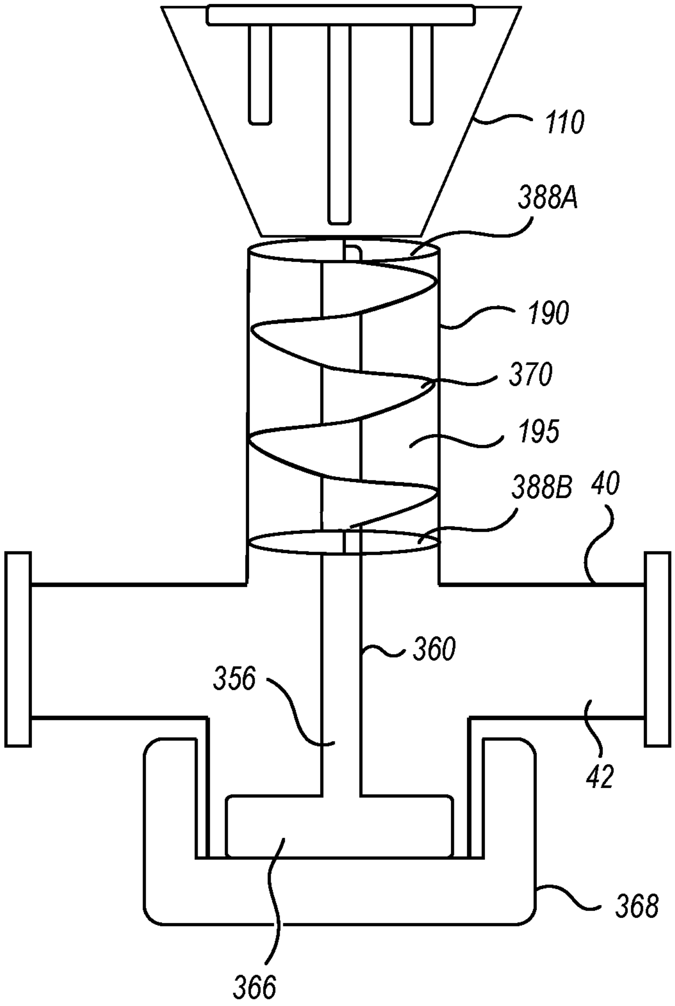
FIG. 26 is an elevated side view of an exemplary auger assembly shown in FIG. 25.

In exemplary embodiments, auger assembly 356 may include a metering and liquid ingress prevention mechanism as shown in FIG. 26. As previously discussed, auger assembly 356 drives powder induction, which is controlled by the rate of rotation of auger blade 370. Constricted windows 388A and 388B at entry and exit points of auger blade 370 could serve as gates. Auger fins could be staggered/spaced to create pulsed flow. When turned to "closed" position, powder and liquid flow should be reduced. Each open turn gets a particular amount of powder 146. In some embodiments, the mixer can be extended into the hopper to prevent air pockets.

Figure 27:
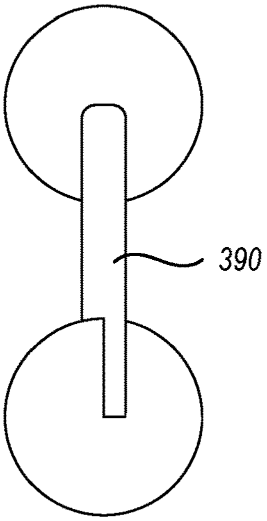
FIG. 27 is a top perspective view of an exemplary shaft that can be used together with the systems herein disclosed, including an exemplary single-use powder airlock apparatus.
Figure 28:
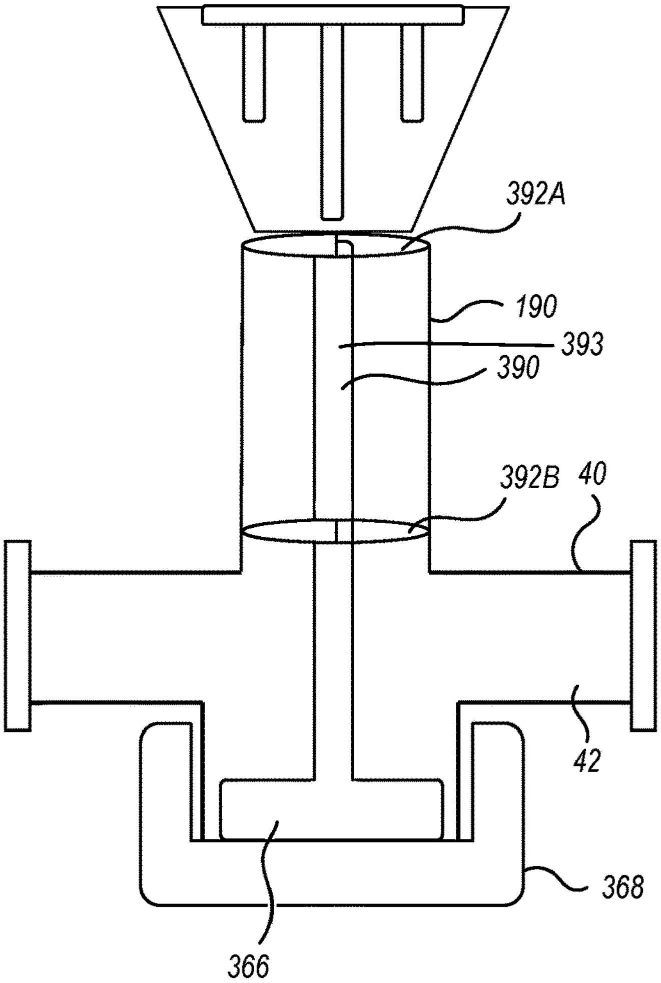
FIG. 28 is an elevated sideview of an exemplary single-use powder airlock apparatus including a shaft of FIG. 27.

FIG. 27 is a top perspective view of a shaft 390 that can be used with a single-use powder airlock apparatus as shown in FIG. 28. The single-use powder airlock may provide for powder metering and liquid ingress prevention. Shaft 390, which functions as a magnetically driven, compact hopper/airlock, can include an airlock feature that will improve induction pump efficiency. Powder induction rate is controlled by opposing position of the valves 392A and 392B. Valves 392A and 392B share common shaft 390. Opening into the chamber 393 occurs when bottom valve 392B is closed. Opening from chamber 393 occurs when the top valve 392A is closed. Shaft 390 could be on a small vertical cam that pushes the valve faces onto each O-ring that is fixed at each throat when the valves 392A and 392B are the 180 and 360 positions. The lower valve 392B is best positioned well above the induction chamber enough that it does not get wet (protected by suction from the pump). The valve plates do not need to be round; they could be elliptical thus more compact having a rotation of 180 degrees or less. Valves alternatively could be guillotine style (instead of rotary). Volume of chamber could vary, but targeting a 4 kg per minute PID feed rate, dictates a 0.5 kg (1.25 L volume) be cycled ~7 seconds.

Figure 29A:
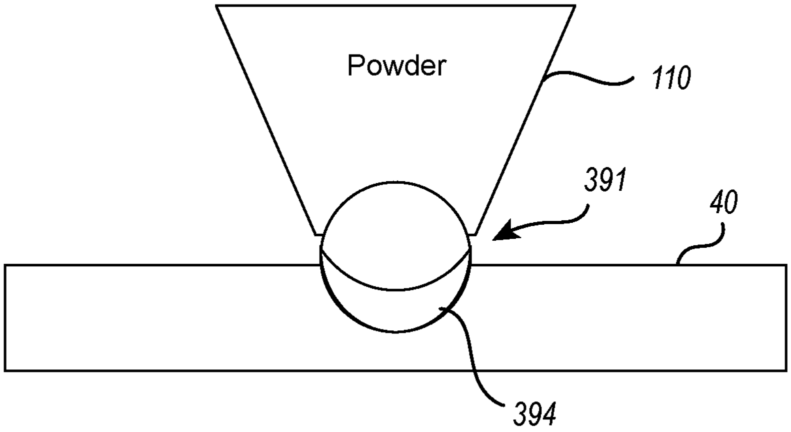
FIGS. 29A and 29B are elevated side views of an exemplary single-use metering valve.
Figure 29B:
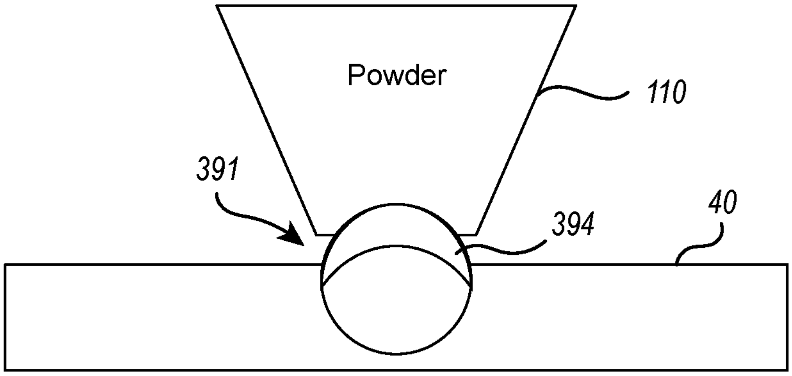

FIGS. 29A and 29B illustrate an exemplary single-use metering valve 391. Single-use metering valve 391 can operate in a similar manner as the auger described previously but can use a rotating cup 394. In some embodiments, the rotation of cup 394 can be driven by an axle or alternatively by a magnet or the combination of the two. In some embodiments, rotary metering valve 391 can be disposable. In an alternate embodiment, rotary metering valve 391 can be treated by any suitable treatment and then reused. In some embodiments, a water inlet can be included to rinse out cup 394. Cup 394 can be rinsed by angling the water inlet with respect to the rinsing stream. The design of cup 394 may need to be optimized (ideally it will serve as an air lock and deliver a plug flow). Alternatively, metering valve 391 can be positioned up out of the liquid 28 so that it will not be wetted. In some embodiments, the speed of rotation of cup 394 can control the feed.

Figure 30A:
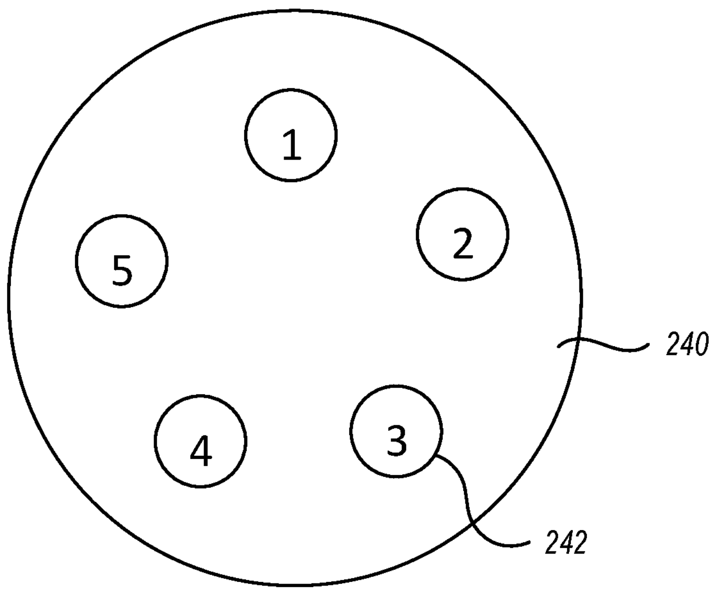
FIGS. 30A and 30B illustrate an exemplary semi-continuous feed hopper system for dispensing powder from powder bags.
Figure 30B:
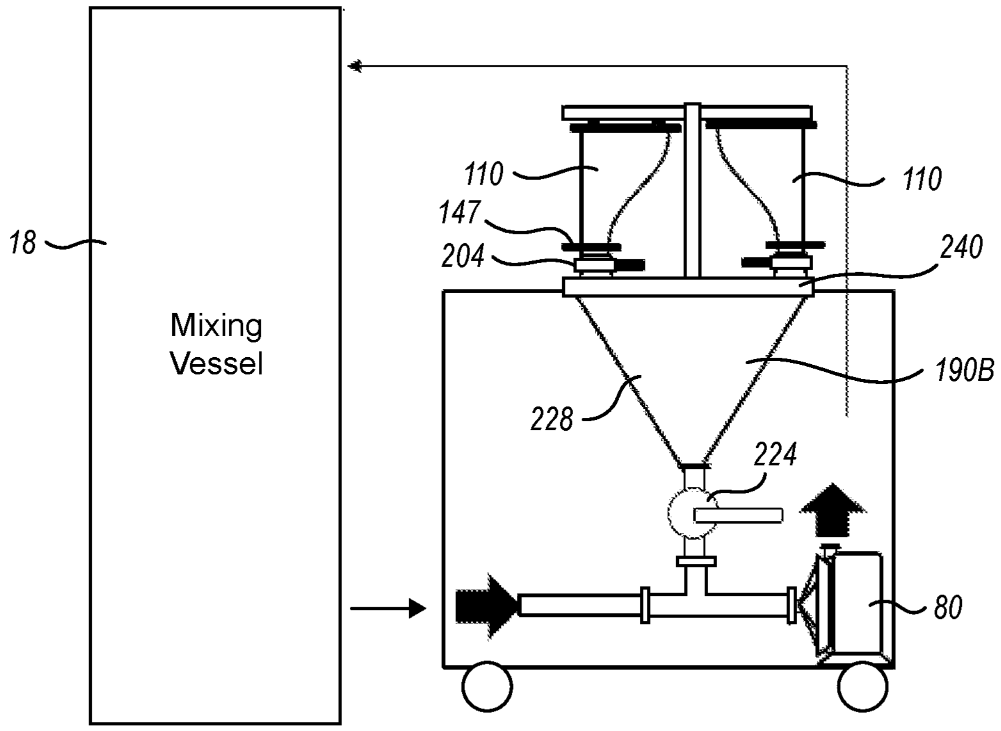

FIGS. 30A and 30B illustrate an exemplary embodiment of a semi-continuous feed hopper system for dispensing powder from powder bags 110. The disclosed system is similar to that disclosed in FIG. 11 and like elements are identified by like reference characters. FIG. 30A shows one embodiment of a top view of hopper lid 240 having port openings 242 configured to couple with powder bags 110. FIG. 30B illustrates one embodiment of a continuous feed system. Integrate multiple powder connection ports (port openings 242) on hopper lid 240 (2+ ports openings so an operator can load a new powder bag 110 while another powder bag 110 is discharging). Charging is achieved by opening gates on each respective powder port 242 near powder bag 110 above hopper 228. Hopper 228 can be rigid and disposable (molded funnels nest into each other for compact shipping and storage, the gasketed lid 240 snaps on prior to use). Hopper 228 can use a flexible liner with gaskets. A port on the hopper 228 can connect to a bench-scale vacuum pump which is used to ensure full conformance of the liner to the reusable hopper 228. Because hopper 228 with lid 240 creates a functionally closed system, it can significantly reduce the tendency for the induction pump 80 to lose suction due to (cavitation) air entrainment. This configuration also eliminates the complication of installing valve 224 below hopper 228. This design is simpler and cheaper than other configurations. It is again noted that in the embodiment depicted in FIG. 30B, pump 80 is disposed downstream of transfer member 190B. In an alternative embodiment, such as those previously discussed, pump 80 can be disposed upstream of transfer member 190B, which can eliminate or reduce the risk of air entrainment with pump 80.

Figure 31A:
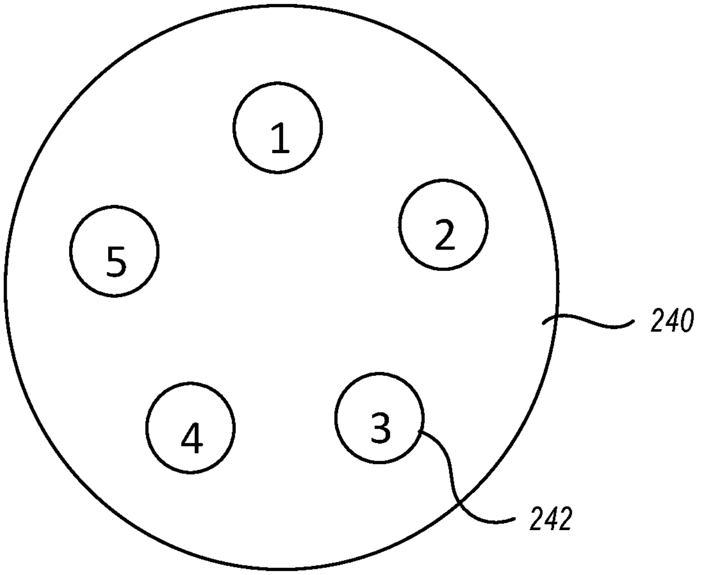
FIGS. 31A and 31B illustrate an exemplary semi-continuous feed hopper system.
Figure 31B:
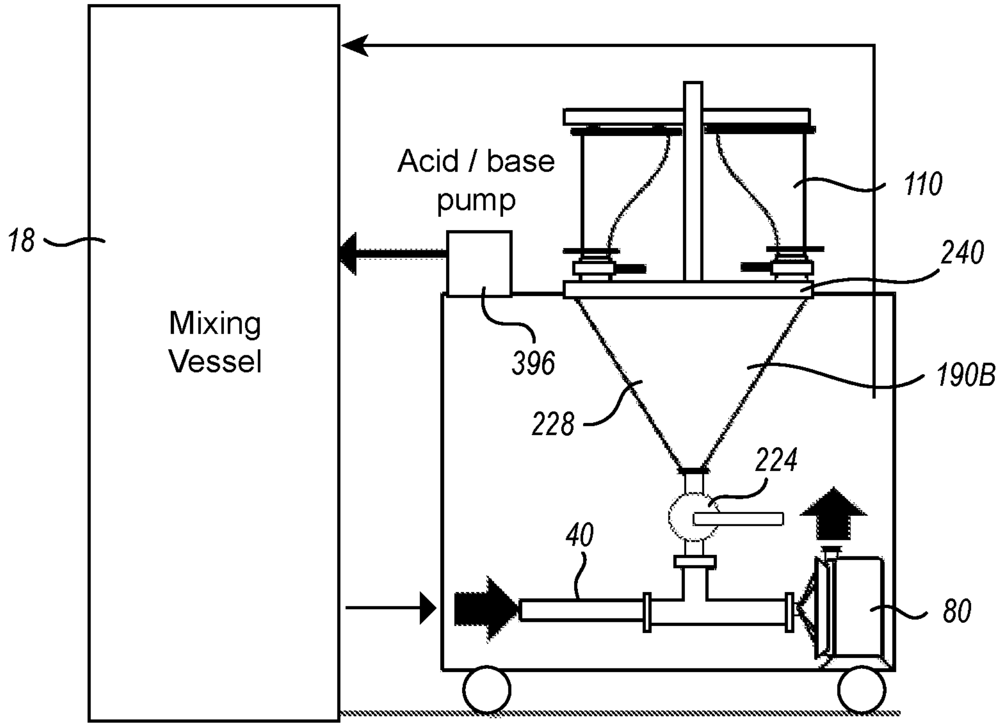

FIGS. 31A and 31B illustrate an exemplary embodiment of a manual or automated powder bag switching and recipes. Again, like elements from prior embodiments are identified by like reference characters. FIG. 31A shows an exemplary embodiment of a top view of hopper lid 240 having port openings 242 configured to couple with powder bags 110. FIG. 31B illustrates an exemplary embodiment of a continuous feed system. The integration of multiple powder connection ports (port openings 242) on hopper lid 240 allows semi-continuous feed if multiple small powder bags 110 feeds are needed (2+ ports so one can load a new powder bag while another is discharging). Powder 146 can be charged in a pre-programmed order by opening gates on each respective powder port 242. Accessory pump 396 can facilitate pH titration to occur between component additions, using an online and integrated single use pH sensor.

Figure 32A:
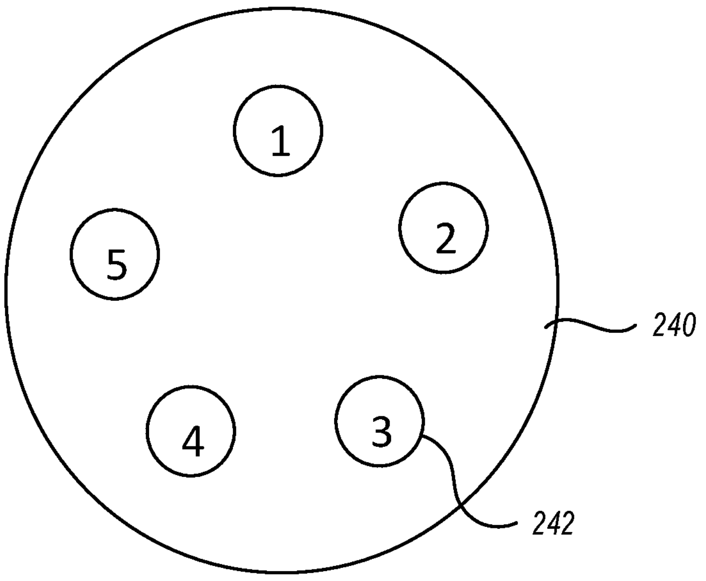
FIGS. 32A and 32B illustrate another exemplary semi-continuous feed hopper system.
Figure 32B:
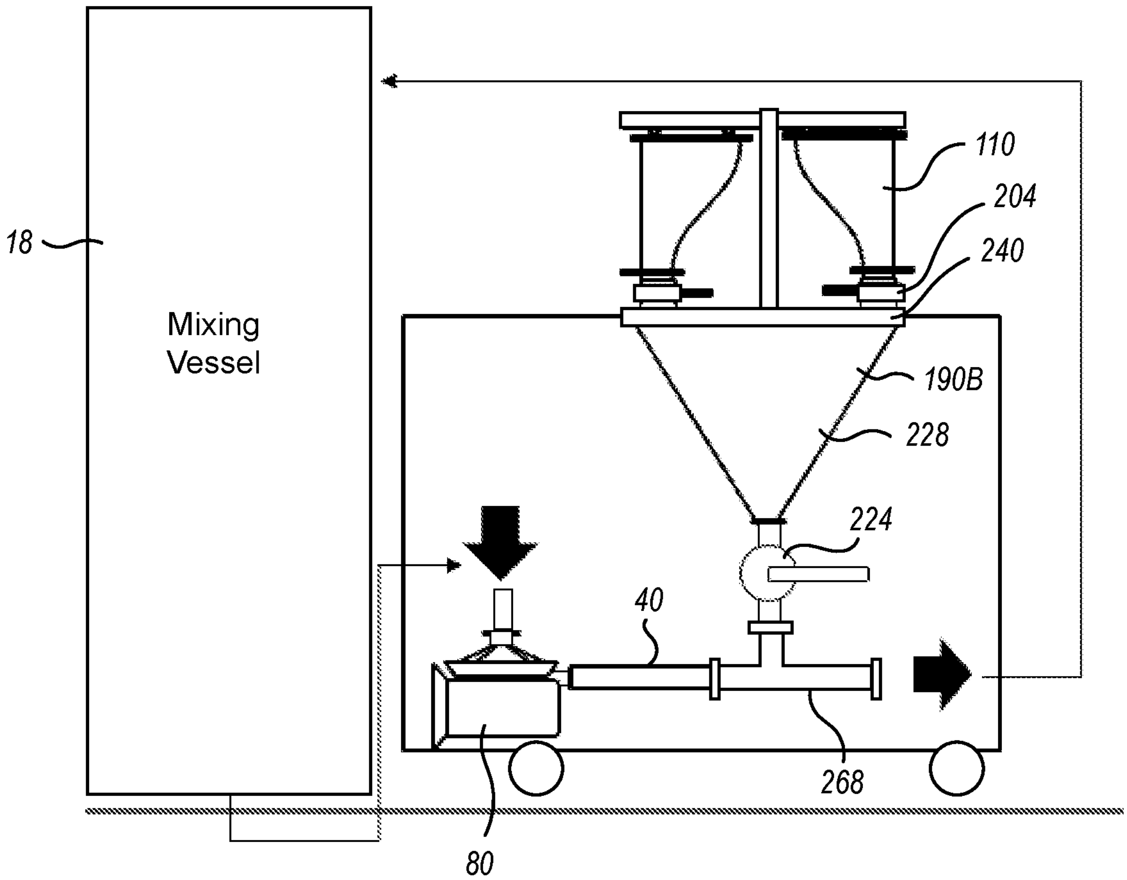

FIGS. 32A and 32B illustrate one embodiment of a semi-continuous feed hopper for powder dispensing from powder bags 110 into a venturi inductor 268A (e.g., FIG. 8). FIG. 32A shows an exemplary embodiment of a top view of a hopper lid 240 having port openings 242 configured to couple with powder bags 110. FIG. 32B illustrates an exemplary embodiment of a continuous feed system. This system integrates multiple powder connection ports (port openings 242) on hopper lid 240 (2+ ports openings 242) so an operator can load a new powder bag 110 while another bag 110 is discharging into the venturi inductor 268A (shown here downstream of pump 80, could be upstream of pump 80). Charging is achieved by opening on each respective powder port opening 242 near powder bag 110 above hopper 228. Hopper 228 can be rigid and disposable (molded funnels nest into each other for compact shipping and storage, the gasketed lid 240 snaps on prior to use). Hopper 228 can use a flexible liner with gaskets. A port on the hopper 228 can connect to a bench-scale vacuum pump, which is used to ensure full conformance of the liner to the reusable hopper 228. Hopper 228 creates a functionally closed system, but can still be susceptible to liquid back-flow from the intake or discharge line if pump 80 is turned-off. Therefore, the risk of wetting, back-flushing can be reduced by adding a manual or automated check-valve device, such as one of the exemplary backflow valves described herein. Components of hopper 228 or the entire hopper 228 can be disposable in terms of design and construction. This system does not have a feed valve positioned below the hopper 228, which can save cost and complications.

Figure 33A:
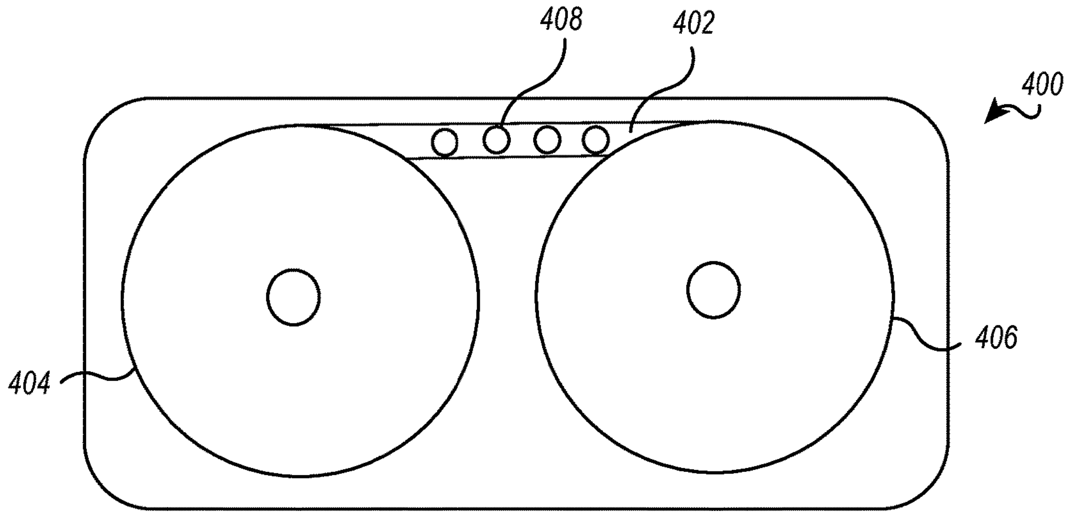
FIGS. 33A and 33B illustrate an exemplary feed valve cassette for powder dispensing from powder bags into an inductor.
Figure 33B:
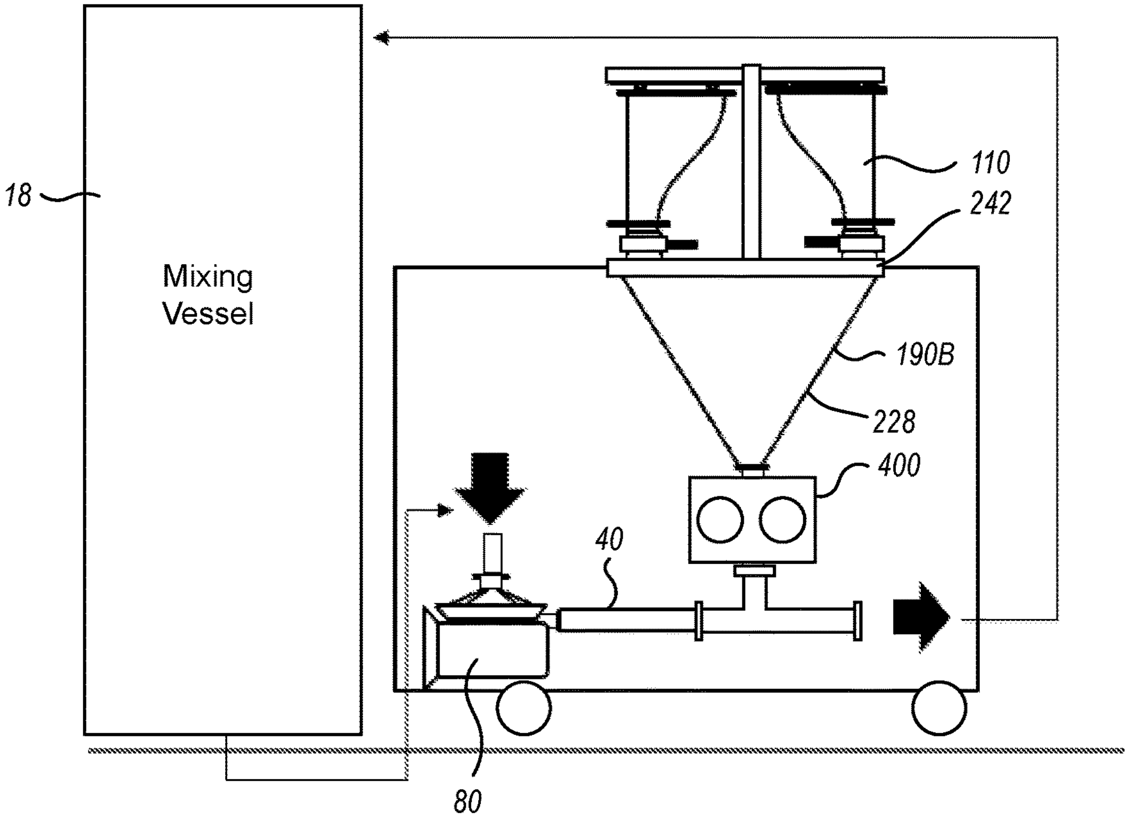

FIGS. 33A and 33B illustrate an exemplary embodiment of a feed valve cassette for powder dispensing from powder bag 110 into an inductor. FIG. 33A shows an exemplary embodiment of a feed valve cassette 400. FIG. 33B illustrates an exemplary embodiment of a continuous feed system having feed valve cassette 400 incorporated therein. Feed valve cassette 400 includes a long strip of film 402 that feeds from a new reel 404 to a used reel 406 within a disposable cassette. Feed valve cassette 400 is positioned above a disposable powder injector/inductor. Film 402 has pre-cut holes 408 that serve as feed opening when position in feed tube (transfer member 190) for powder entry. If film 402 becomes wetted it feeds to used reel 406. Feed hopper 228 can have a gasket or O-ring in order to make a leak proof seal against film 402 when desired (ideal for preventing back-flow from the liquid stream). Charging is achieved by opening on each respective powder port 242 near powder bag 110 above hopper 228. The charging is controlled via automation (e.g., encoder, servo motor, and optics or pressure monitoring).

Figure 34:
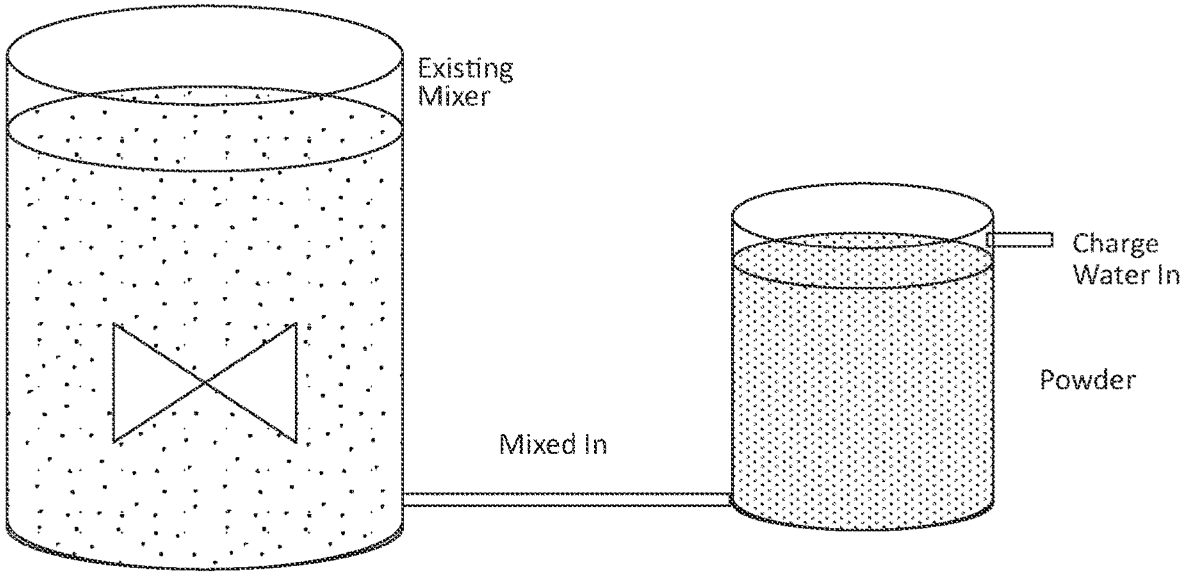
FIG. 34 shows a perspective view of an exemplary system for charging water.

In some embodiments, charging water may be used to aid in mixing. FIG. 34 shows an exemplary embodiment of a system including charging water. Most powder mixing processes ask for initially loading ~50-80% of the water, and then adding powder, and then topping off with the rest of the water. The time needed to charge water is going to happen, regardless. Pumps for the water supply are usually large but can supplement some of the pumps in the system. This system can be used with liquid and powder.

Figure 35A:
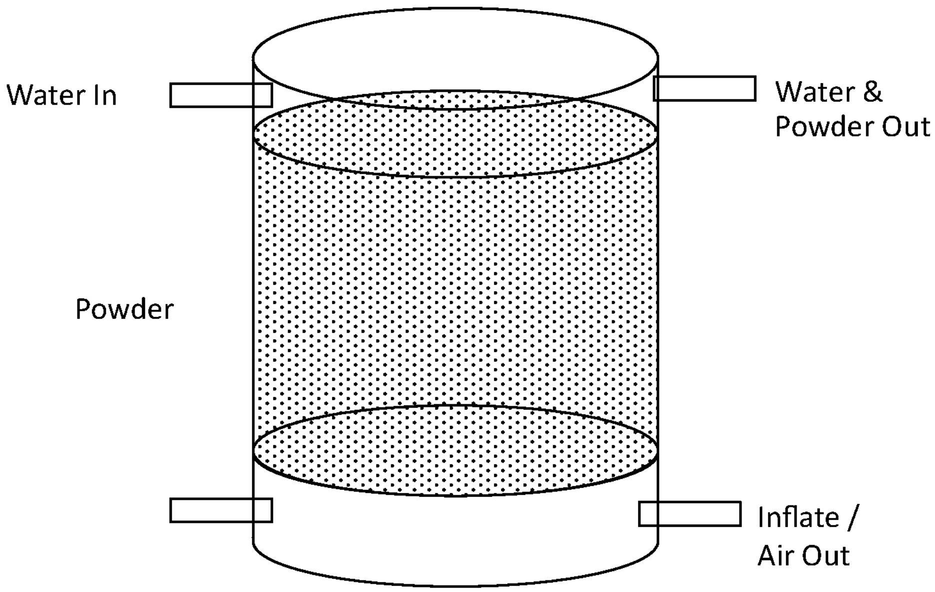
FIGS. 35A and 35B show perspective views of how a powder bag may be adapted for powder delivery.
Figure 35B:
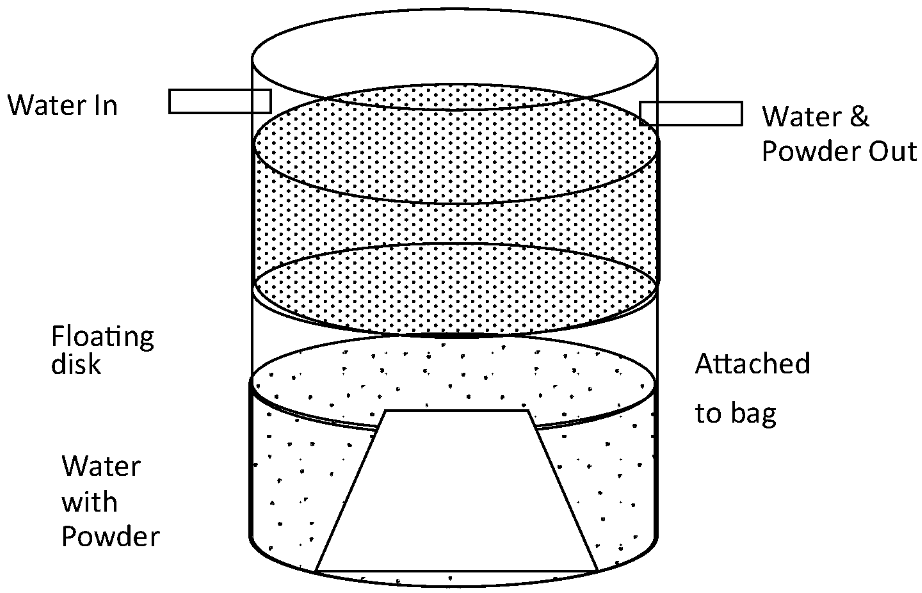

FIGS. 35A and 35B show how a powder bag that be adapted for powder delivery and use in the exemplary powder hydration systems herein disclosed. Rather than gravity feed powders, as shown in FIG. 35A, in some embodiments other driving forces can be used to add powder to liquid. The driving forces may be from the bottom-up. Air bladder lifting powder up—fill with air to push powder into liquid flow stream. Floating disk/ring lifting powder up when water present as shown in FIG. 35B.

Embodiments of the present disclosure can achieve a number of benefits. For example, the powder mixing system directly incorporates the powder into a flowing stream of liquid. This process significantly decreases mixing time relative to conventional systems and avoids loss of powder due to build up on the wall of the hydration container. The mixing process can be enhanced by the use of an eductor and/or auger which also regulate powder flow and decrease clogging. The mixing system is especially effective for hydrophobic and low bulk density powder because of its raid and effective incorporation of the powders into the liquid. Placement of the powder mixing system on ground level adjacent to the hydration tank eliminates the need for access structures to be built on the hydration container and eliminates the need for the purchase, assembly and operation of industrial lifts, thereby minimizing cost and increasing safety. Other benefits, such as those previously discussed herein are also achieved.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A powder mixing system comprising:

a conduit having a first end and an opposing second end, the conduit bounding a passage, a fluid pump fluid coupled to the conduit, the fluid pump being configured to pump a liquid through the passage of the conduit; a tubular transfer member in fluid communication with the conduit, the transfer member configured to couple to a powder bag housing a powder; and further comprising:

an eductor coupled to the transfer member and disposed in-line with the conduit so that the liquid pumped through the conduit also passes through the eductor; and an auger assembly comprising an auger blade, at least a portion of the auger assembly being rotatably disposed within the transfer member; and wherein the eductor comprises a venturi; and wherein the conduit further comprises a sidewall encircling the passage, a side opening extending through the sidewall and communicating with the passage; and the auger assembly comprising:

a rotatable drive shaft passing through the side opening of the conduit so that a lower portion of the drive shaft is disposed within the passage of the conduit and an upper portion of the drive shaft is at least partially disposed within passage of the transfer member; and the tubular transfer member bounds a passage and the transfer member further comprises a first end fluid coupled to the side opening of the conduit and an opposing second end configured to couple with the powder bag; and the auger blade disposed on the upper portion of the drive shaft so as to be at least partially disposed within the passage of the transfer member.

2. The mixing system as recited in claim 1, wherein the eductor is disposed on the conduit downstream of the fluid pump.

3. The mixing system as recited in claim 1, wherein the eductor further comprises a tubular sidewall having an interior surface that bounds a channel extending between an inlet end coupled to the conduit and an opposing outlet end coupled to the conduit, a side opening extending through the sidewall of the eductor communicating with the channel at a location between the inlet end and the outlet end; and the tubular transfer member bounds a passage, and the tubular transfer member further comprises a first end fluid coupled to the side opening of the eductor and an opposing second end configured to couple with the powder bag.

4. The mixing system as recited in claim 3, wherein the channel of the eductor comprises:

an inlet portion disposed at the inlet end and having a first maximum diameter;

a receiving portion disposed toward the outlet end and having a second maximum diameter; and a constricting portion disposed between the inlet portion and the receiving portion and having a third maximum diameter that is smaller than the first maximum diameter and the second maximum diameter, the side opening being aligned with and communicating with the receiving portion or the constricting portion creating a pressure drop within the eductor when fluid is pumped through the channel and an assisting force that aids in flowing the powder through the transfer member.

5. The mixing system as recited in claim 3, wherein the transfer member comprises a tapered hopper having the first end that is constricted and fluid coupled to the side opening and the opposing second end that bounds an enlarged access opening.

6. The mixing system as recited in claim 5, further comprising a plurality of collapsible powder bags coupled to the second end of the hopper, each of the powder bags housing a powder, the plurality of collapsible powder bags comprising at least 2 collapsible powder bags.

7. The mixing system as recited in claim 1, wherein the powder bag comprises: a collapsible bag that bounds a compartment and is comprised of one or more sheets of a polymeric film, the collapsible bag having a front face and an opposing back face that extend between a first side and a spaced apart second side and that both extend between an upper end and an opposing lower end, the upper end terminating at an upper edge and the lower end terminating at lower edge; and a tubular port secured to the lower end of the collapsible bag, the tubular port bounding an opening that communicates with the compartment of the bag, wherein when the collapsible bag is inflated, the opening of the port has a central longitudinal axis that extends to the upper end of the collapsible bag and the collapsible bag has an asymmetrical configuration about the central longitudinal axis.

8. The mixing system as recited in claim 7, further comprising:

the first side of the collapsible bag having a maximum first distance from the central longitudinal axis measured orthogonal from the central longitudinal axis; and the second side of the collapsible bag having a maximum second distance from the central longitudinal axis measured orthogonal from the central longitudinal axis, the maximum second distance being at least 3 times greater than the first maximum distance.

* * * * *